(12) United States Patent
Zhou et al.

(10) Patent No.: US 11,933,795 B2
(45) Date of Patent: Mar. 19, 2024

(54) CONTINUOUS SAMPLE INTRODUCTION METHOD, SAMPLE INTRODUCTION APPARATUS AND STORAGE MEDIUM

(71) Applicants: SHENZHEN MINDRAY BIO-MEDICAL ELECTRONICS CO., LTD., Shenzhen (CN); SHENZHEN MINDRAY SCIENTIFIC CO., LTD., Shenzen (CN)

(72) Inventors: Yang Zhou, Shenzhen (CN); Xianhua Chang, Shenzhen (CN); Yang Zhang, Shenzhen (CN)

(73) Assignees: SHENZHEN MINDRAY BIO-MEDICAL ELECTRONICS CO., LTD., Shenzhen (CN); SHENZHEN MINDRAY SCIENTIFIC CO., LTD., Shenzhen (CN)

( * ) Notice: Subject to any disclaimer, the term of this patent is extended or adjusted under 35 U.S.C. 154(b) by 631 days.

(21) Appl. No.: 17/119,871

(22) Filed: Dec. 11, 2020

(65) Prior Publication Data
US 2021/0096143 A1   Apr. 1, 2021

Related U.S. Application Data

(63) Continuation of application No. PCT/CN2019/093668, filed on Jun. 28, 2019.

(30) Foreign Application Priority Data

Jun. 28, 2018 (WO) ................ PCT/CN2018/093479

(51) Int. Cl.
G01N 35/00 (2006.01)
G01N 35/04 (2006.01)
G01N 35/10 (2006.01)

(52) U.S. Cl.
CPC ....... *G01N 35/00584* (2013.01); *G01N 35/04* (2013.01); *G01N 35/10* (2013.01)

(58) Field of Classification Search
CPC .. G01N 35/00584; G01N 35/04; G01N 35/10; G01N 2035/0401; G01N 2035/0491
See application file for complete search history.

(56) References Cited

U.S. PATENT DOCUMENTS

2005/0196320 A1* 9/2005 Veiner .................. G01N 35/04
422/63

FOREIGN PATENT DOCUMENTS

| CN | 102221624 A | 10/2011 |
|---|---|---|
| CN | 202556410 U | 11/2012 |

(Continued)

*Primary Examiner* — Eric S. McCall
*Assistant Examiner* — Timothy P Graves
(74) *Attorney, Agent, or Firm* — Kory D. Christensen

(57) ABSTRACT

A continuous sample introduction method is provided. The method includes controlling a current sample holder advancing mechanism to perform an advancing operation according to a sample introduction trigger signal, so that the current sample holder advancing mechanism moves in a direction from an initial position to a limiting position, and during the movement, a pushing portion of the current sample holder advancing mechanism is capable of abutting against a side wall of a sample holder in a current sample loading device; controlling the current sample holder advancing mechanism to perform a returning operation when the current sample holder advancing mechanism moves to the limiting position, and during the movement, the pushing portion is capable of avoiding contacting with the sample holder; and the current sample holder advancing mechanism automatically repeats the advancing operation and the returning operation when the current sample holder advancing mechanism moves to the initial position.

21 Claims, 7 Drawing Sheets

(56) References Cited

FOREIGN PATENT DOCUMENTS

| | | | |
|---|---|---|---|
| CN | 203587595 | U | 5/2014 |
| CN | 203610551 | U | 5/2014 |
| CN | 104198747 | A | 12/2014 |
| CN | 104215783 | A | 12/2014 |
| CN | 104569450 | A | 4/2015 |
| CN | 104569451 | A | 4/2015 |
| CN | 106041637 | A | 10/2016 |
| CN | 106429371 | A | 2/2017 |
| CN | 106771295 | A | 5/2017 |
| CN | 106829422 | A | 6/2017 |
| CN | 107132369 | A | 9/2017 |
| CN | 206470280 | U | 9/2017 |
| CN | 107238717 | A | 10/2017 |
| CN | 206657025 | U | 11/2017 |
| CN | 206920456 | U | 1/2018 |
| CN | 206990613 | U | 2/2018 |
| CN | 206990614 | U | 2/2018 |
| CN | 108196080 | A | 6/2018 |
| CN | 208297536 | U | 12/2018 |
| JP | 2010085098 | A | 4/2010 |
| WO | WO 2011/047710 | A1 | 4/2011 |

\* cited by examiner

```
┌─────────────────────────────────────────────────────────────────────┐
│ Controlling a current sample holder advancing mechanism to perform  │
│ an advancing operation according to a sample introduction trigger   │
│ signal corresponding to the current sample holder advancing         │──S200
│ mechanism, wherein the advancing operation comprises controlling    │
│ the current sample holder advancing mechanism to move in a          │
│ direction from an initial position to a limiting position, and      │
│ during the movement of the current sample holder advancing          │
│ mechanism in the direction from the initial position to the         │
│ limiting position, the pushing portion of the current sample holder │
│ advancing mechanism is capable of abutting against the side         │
│ wall of the sample holder in a current sample loading device.       │
└─────────────────────────────────────────────────────────────────────┘
                              ▼
┌─────────────────────────────────────────────────────────────────────┐
│ Controlling the current sample holder advancing mechanism to        │
│ perform a returning operation when the current sample holder        │
│ advancing mechanism moves to the limiting position, wherein the     │──S210
│ returning operation comprises controlling the current sample holder │
│ advancing mechanism to move in a direction from the limiting        │
│ position to the initial position, and during the movement of the    │
│ current sample holder advancing mechanism in the direction from     │
│ the limiting position to the initial position, the pushing portion  │
│ of the current sample holder advancing mechanism is capable of      │
│ locating at a safety position in which the pushing portion is not   │
│ in contact with the sample holder.                                  │
└─────────────────────────────────────────────────────────────────────┘
                              ▼
┌─────────────────────────────────────────────────────────────────────┐
│ When the current sample holder advancing mechanism moves to the     │
│ initial position, a sample introduction trigger signal of a next    │
│ sample holder advancing mechanism is obtained, and the next         │──S220
│ sample holder advancing mechanism is controlled to perform the      │
│ advancing operation and the returning operation, and if other       │
│ sample holder advancing mechanisms are all in a pause state, the    │
│ current sample holder advancing mechanism is controlled to          │
│ repeatedly perform the advancing operation and the returning        │
│ operation.                                                          │
└─────────────────────────────────────────────────────────────────────┘
```

*FIG. 9*

```
┌─────────────────────────────────────────────────────────────────────┐
│ When the current sample holder advancing mechanism is in the        │
│ sample introduction state, if other sample introduction trigger     │──S300
│ signals are received, updating respective states of sample holder   │
│ advancing mechanisms corresponding to the other sample introduction │
│ trigger signals to a sample introduction ready state.               │
└─────────────────────────────────────────────────────────────────────┘
                              ▼
┌─────────────────────────────────────────────────────────────────────┐
│ When the pushing portion of the current sample holder advancing     │
│ mechanism stops at the safety position, selecting any one of the    │──S310
│ other sample introduction trigger signals as the sample             │
│ introduction trigger signal of the next sample holder advancing     │
│ mechanism, and the next sample holder advancing mechanism is        │
│ controlled to perform the advancing operation and the returning     │
│ operation.                                                          │
└─────────────────────────────────────────────────────────────────────┘
```

*FIG. 10*

```
┌─────────────────────────────────────────────────────────────────────┐
│ Obtaining a connection state of the first detection element         │──S400
│ and the second detection element in real time.                      │
└─────────────────────────────────────────────────────────────────────┘
                              ▼
┌─────────────────────────────────────────────────────────────────────┐
│ When the connection state of the first detection element and the    │
│ second detection element is switched from a first state to a        │──S410
│ second state, determining that the foremost sample holder between   │
│ the current position of the push plate and the limiting position    │
│ driven by the push plate moves to the limiting position.            │
└─────────────────────────────────────────────────────────────────────┘
                              ▼
┌─────────────────────────────────────────────────────────────────────┐
│ Whenever the foremost sample holder between the current position    │
│ of the push plate and the limiting position is driven by the push   │──S420
│ plate to move to the limiting position, controlling the push plate  │
│ to move for a preset distance from the current position to the      │
│ initial position.                                                   │
└─────────────────────────────────────────────────────────────────────┘
```

*FIG. 11*

CONTINUOUS SAMPLE INTRODUCTION METHOD, SAMPLE INTRODUCTION APPARATUS AND STORAGE MEDIUM

CROSS-REFERENCE TO RELATED APPLICATIONS

This application is a continuation of International Application No. PCT/CN2019/093668, filed Jun. 28, 2019, for "CONTINUOUS SAMPLE INTRODUCTION METHOD, SAMPLE INTRODUCTION APPARATUS AND STORAGE MEDIUM," which claims priority to International Application No. PCT/CN2018/093479, filed Jun. 28, 2018, both of which are incorporated herein by reference.

TECHNICAL FIELD

The present application relates to sample analyzers and, in particular, to continuous sample introduction method, a sample introduction apparatus, and related storage medium.

BACKGROUND

With the development of automatic control technology, automatic equipment has been widely applied in the biomedical examination industry. A general fully automatic sample analyzer usually comprises an automatic sample introduction apparatus to realize automatic sample feeding. The traditional automatic sample introduction apparatus can be a rotary-tray-based sample introduction apparatus or a track-based sample introduction apparatus, in which in the track-based sample introduction apparatus, a sample loading device can be separated from a sample holder advancing mechanism, such that there is no need to pause the sample detection operation of the sample analyzer during sample introduction. However, if a new sample holder is additionally placed into the sample loading device while the sample holder advancing mechanism is moving, there may be hidden dangers or failures, such as falling and pouring of the sample in the sample holder.

SUMMARY

For solving the above technical problem, a continuous sample introduction method, a sample introduction apparatus, and a related storage medium are provided, which can additionally place new sample holders into a sample loading device without pausing the sample holder advancing mechanism and without pausing the sample detection operation, thereby realizing continuous sample introduction.

A continuous sample introduction method may operate on a sample introduction apparatus, the sample introduction apparatus comprising one or more sample loading devices, each of which is correspondingly provided with a sample holder advancing mechanism which comprises a pushing portion capable of abutting against a side wall of a sample holder in the sample loading device. The method may include:

controlling a current sample holder advancing mechanism to perform an advancing operation according to a sample introduction trigger signal corresponding to the current sample holder advancing mechanism, wherein the advancing operation comprises controlling the current sample holder advancing mechanism to move in a direction from an initial position to a limiting position, and during the movement of the current sample holder advancing mechanism in the direction from the initial position to the limiting position, the pushing portion of the current sample holder advancing mechanism is capable of abutting against the side wall of the sample holder in a current sample loading device;

controlling the current sample holder advancing mechanism to perform a returning operation when the current sample holder advancing mechanism moves to the limiting position, wherein the returning operation comprises controlling the current sample holder advancing mechanism to move in a direction from the limiting position to the initial position, and during the movement of the current sample holder advancing mechanism in the direction from the limiting position to the initial position, the pushing portion of the current sample holder advancing mechanism is located at a safety position in which the pushing portion is not in contact with the sample holder; and the current sample holder advancing mechanism automatically repeats the advancing operation and the returning operation when the current sample holder advancing mechanism moves to the initial position;

wherein the limiting position is located at one end of the current sample loading device connected to a sample analysis device, and the initial position is located at the other end of the current sample loading device that is opposite to the limiting position.

A sample introduction apparatus includes:

a sample loading device;

a sample holder advancing mechanism provided corresponding to the sample loading device, and the sample holder advancing mechanism comprising a pushing portion; and a control device for controlling the sample holder advancing mechanism to perform an advancing operation and a returning operation between an initial position and a limiting position according to a sample introduction trigger signal, wherein when the control device controls the sample holder advancing mechanism to perform the advancing operation, the pushing portion is capable of abutting against a side wall of a sample holder, and when the control device controls the sample holder advancing mechanism to perform the returning operation, the pushing portion is capable of being located at a safety position in which the pushing portion is not in contact with the sample holder; and when a current sample holder advancing mechanism moves to the initial position, the current sample holder advancing mechanism automatically repeats the advancing operation and the returning operation.

A computer-readable storage medium may store computer program therein, the computer program implementing the steps in the method as described above when being executed by a processor.

According to the continuous sample introduction method, the sample introduction apparatus and the storage medium described above, during the movement of the pushing portion in the direction from the initial position to the limiting position, the pushing portion is capable of abutting against the sample holder located between the current position of the pushing portion and the limiting position to drive the sample holder to move, so as to realize the transfer of the sample holder and the sample introduction; and during the movement of the pushing portion in the direction from the limiting position to the initial position, the pushing portion is capable of avoiding contacting with the sample holder located in the sample loading device, so as to avoid the hidden danger or failure of sample introduction that may occur when a new sample holder is additionally placed into the sample loading device while the sample holder advancing mechanism is moving, such that a new sample holder can be additionally placed into the sample loading device without pausing the sample holder advancing mechanism and without pausing the sample detection operation, thereby realizing continuous sample introduction.

BRIEF DESCRIPTION OF THE DRAWINGS

FIG. 9 is a flow chart of a continuous sample introduction method of multiple sample loading devices according to another embodiment;

FIG. 10 is a flow chart of a method for determining the next sample holder advancing mechanism according to an embodiment; and FIG. 11 is a flow chart of a sample holder pushing process according to an embodiment.

Figure 1:
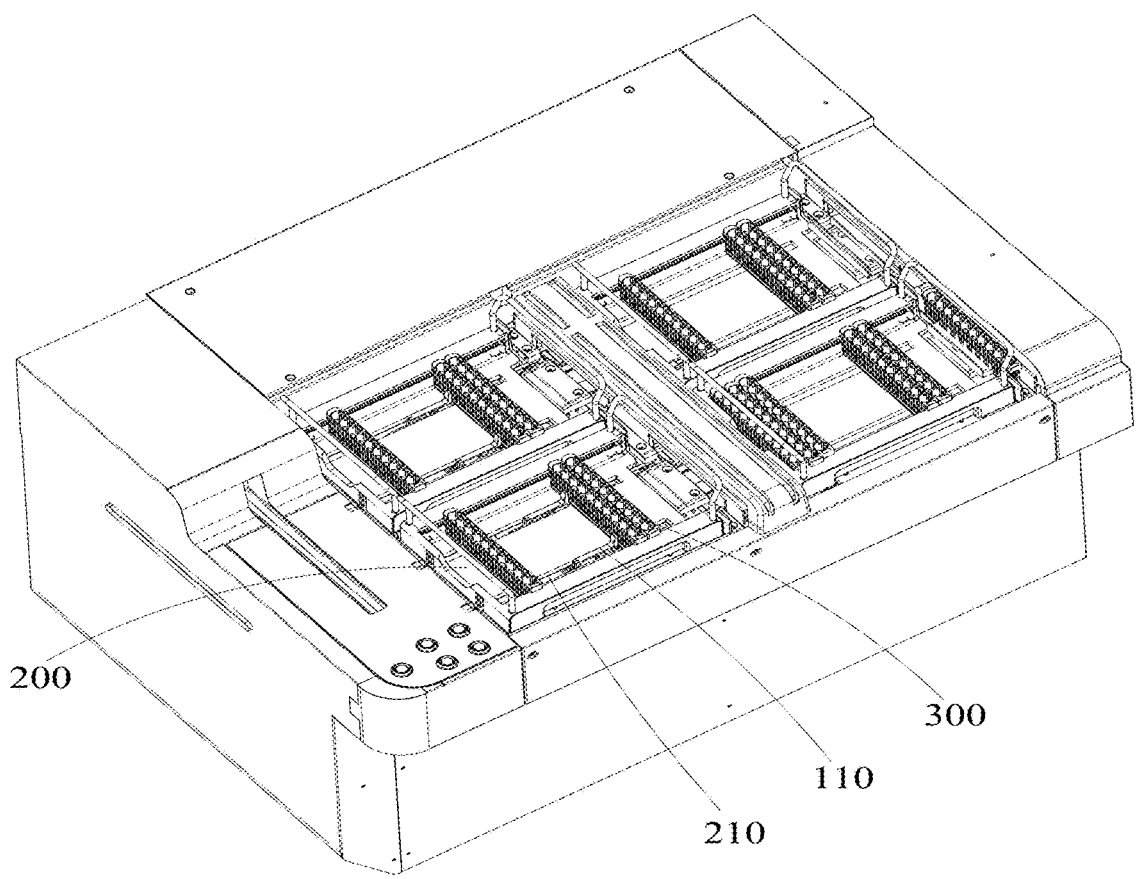
FIG. 1 is a schematic structural diagram of a sample introduction apparatus in an embodiment.

In the figures, the following reference numerals are used:
100—sample holder advancing mechanism;
110—push plate;
120—lifting structure;
121—first driving component;
122—lifting assembly;
1221—lifting guide component;
1222—lifting sliding component;
1223—transmission component;
12231—rotating arm;
12232—rolling wheel;
12233—transmission guide portion;
12234—guide slot;
130—advancing structure;
131—second driving component;
132—advancing assembly;
1321—advancing guide component;
1322—first sliding component;
13221—support base;
13222—second detection element;
13223—first mounting portion;
1323—second sliding component;
13231—pedestal;
13232—first detection element;
13233—second mounting portion;
1324—flexible connecting member;
200—sample loading device;
210—transfer recess; and
300—sample holder.

DETAILED DESCRIPTION

In order to clarify the objectives, technical solutions, and advantages of the present application, various embodiments will be further described below in conjunction with the accompanying drawings. It should be understood that the particular embodiments described here are merely intended to explain the present application but are not intended to restrict the present application.

As shown in FIG. 1, one embodiment of the present application provides a sample introduction apparatus comprising one or more sample loading devices 200, sample holder advancing mechanisms 100 provided corresponding to the sample loading devices 200, and a control device (not shown). The sample loading device 200 is used to place a sample holder 300, and one end of the sample loading device 200 is connected to a sample analysis device. Optionally, in an extension direction of the sample loading device 200, an initial position and a limiting position are provided. The limiting position is located at one end of the sample loading device 200 connected to the sample analysis device, and the initial position is located at the other end of the sample loading device 200 that is opposite to the limiting position. Optionally, the sample loading device 200 can be used to hold therein a movable carrying device, such as a basket. The movable carrying device is used to place the sample holder 300.

Each of the sample loading devices 200 is correspondingly provided with a sample holder advancing mechanism 100. The sample holder advancing mechanism 100 can be arranged at a lower portion of the sample loading device 200, and by means of hiding the sample holder advancing mechanism in the lower portion of the sample loading device, the volume of the sample introduction apparatus can be reduced. The sample holder advancing mechanism 100 comprises a pushing portion that is capable of abutting against a side wall of a sample holder in the sample loading device. For example, the pushing portion may be a push plate, a push rod, etc.

The control device is used for controlling a current sample holder advancing mechanism to perform an advancing operation according to a sample introduction trigger signal corresponding to the current sample holder advancing mechanism, wherein the advancing operation comprises controlling the current sample holder advancing mechanism to move in a direction from an initial position to a limiting position. During the movement of the current sample holder advancing mechanism in the direction from the initial position to the limiting position, the pushing portion of the current sample holder advancing mechanism is capable of abutting against the side wall of the sample holder in the current sample loading device; controlling the current sample holder advancing mechanism to perform a returning operation when the current sample holder advancing mechanism moves to the limiting position, wherein the returning operation comprises controlling the current sample holder advancing mechanism to move in a direction from the limiting position to the initial position, and during the movement of the current sample holder advancing mechanism in the direction from the limiting position to the initial position, the pushing portion of the current sample holder advancing mechanism is capable of locating at a safety position in which pushing portion is not in contact with the sample holder; and the current sample holder advancing mechanism automatically repeats the advancing operation and the returning operation when the current sample holder advancing mechanism moves to the initial position; or when the current sample holder advancing mechanism moves to the initial position, obtaining a sample introduction trigger signal of the next sample holder advancing mechanism for controlling the next sample holder advancing mechanism to perform the advancing operation and the returning operation, and if other sample holder advancing mechanisms are all in a pause state, controlling the current sample holder advancing mechanism to repeatedly perform the advancing operation and the returning operation.

Optionally, each of the sample holder advancing mechanisms 100 is correspondingly provided with a signal trigger device for generating a sample introduction trigger signal to control the movement of the corresponding sample holder advancing mechanism 100, each signal trigger device being connected to the control device. The signal trigger device may be a start button arranged on the sample introduction apparatus, and may also be a touch control arranged on the interaction display device, such as a start button displayed on a touch panel. Optionally, the sample loading device is further provided with a movable carrying device, such as a basket, for placing a sample holder, and each of the sample loading devices is provided with a loading detection device for detecting the movable carrying device; and the signal trigger device is the loading detection device. That is, when the loading detection device detects that the movable carrying device is placed in the sample loading device, a sample introduction trigger signal of the sample holder advancing mechanism corresponding to the sample loading device can be generated.

In an embodiment, the control device is further used for, when the current sample holder advancing mechanism moves to the initial position, the current sample holder advancing mechanism automatically repeats the advancing operation and the returning operation until it is detected that a current position of the pushing portion of the current sample holder advancing mechanism is the limiting position in more than two consecutive detections; and if it is detected that the current position of the pushing portion of the current sample holder advancing mechanism is the limiting position in more than two consecutive detections, controlling the pushing portion of the current sample holder advancing mechanism to stop at the safety position, and switching a state of the current sample holder advancing mechanism from a sample introduction state to a pause state.

Further, the control device is further used for, when the pushing portion of the current sample holder advancing mechanism stops at the safety position, obtaining a sample introduction trigger signal of a next sample holder advancing mechanism according to the pause state of the current sample holder advancing mechanism, and controlling the next sample holder advancing mechanism to perform the advancing operation and the returning operation.

Alternatively, the control device is further used for, when the current sample holder advancing mechanism is in the sample introduction state, if other sample introduction trigger signals are received, updating respective states of sample holder advancing mechanisms corresponding to the other sample introduction trigger signals to a sample introduction ready state; and when the pushing portion of the current sample holder advancing mechanism is controlled to stop at the safety position, selecting any one of the other sample introduction trigger signals as the sample introduction trigger signal of the next sample holder advancing mechanism, and controlling the next sample holder advancing mechanism to perform the advancing operation and the returning operation.

In an embodiment, the control the device is further used for, when the current sample holder advancing mechanism moves to the initial position, switching the state of motion of the current sample holder advancing mechanism from the sample introduction state to the pause state; and obtaining the sample introduction trigger signal of the next sample holder advancing mechanism according to the pause state of the current sample holder advancing mechanism, and controlling the next sample holder advancing mechanism to perform the advancing operation and the returning operation.

In another embodiment, the control device is used for, when the current sample holder advancing mechanism moves to the initial position, if other sample introduction trigger signals are received, updating the state of the other sample holder advancing mechanisms to a sample introduction ready state; and when the pushing portion of the current sample holder advancing mechanism is controlled to stop at the safety position, selecting any one of the other sample introduction trigger signals as the sample introduction trigger signal of the next sample holder advancing mechanism, and controlling the next sample holder advancing mechanism to perform the advancing operation and the returning operation.

In an embodiment, as shown in FIGS. 2 to 5, the sample holder advancing mechanism 100 comprises a push plate 110, a lifting structure 120, and an advancing structure 130. Accordingly, as shown in FIG. 1, a bottom wall of the sample loading device 200 is provided with a transfer recess 210, and the transfer recess 210 is arranged in an extension direction of the sample loading device 200. The start position of the transfer recess 210 may be the above initial position, and the end position of the transfer recess 210 may be the above limiting position. Optionally, a bottom wall of the movable carrying device is provided with a recess corresponding to the above transfer recess 210, such that the sample holder advancing mechanism 100 can extend out of the transfer recess 210 and the recess in the movable carrying device and abut against the side wall of the sample holder in the movable carrying device.

The push plate 110 can extend out of the transfer recess 210 and abut against the side wall of the sample holder in the sample loading device 200, such that the sample holder moves more stably during the movement of the sample holder pushed by the push plate 110. Optionally, the push plate 110 may have two push claws, which are spaced by a certain distance. Accordingly, the number of the transfer recess 210 may be two, and the two transfer recesses 210 are respectively arranged corresponding to the two push claws, as shown in FIG. 1. Of course, in other embodiments, the number of the push plate 110 may be one, and accordingly, the number of the transfer recess 210 may also be one. Further, the push plate 110 may be provided with a damping component so as to buffer the contact force of the push plate 110 and the sample holder, such that the sample holder moves more stably. Optionally, the damping element may be a component of silicone, etc. with a buffer function.

The lifting structure 120 may comprise a first driving component 121 and a lifting assembly 122, the push plate 110 is arranged on the lifting assembly 122, and the first driving component 121 can drive the lifting assembly 122 to drive the push plate 110 to move in a reciprocating motion in a first direction. As shown in FIG. 1, the first direction may be a vertical direction, and then, the first driving component 121 can drive the lifting assembly 122 to drive the push plate 110 to move in a reciprocating motion in the vertical direction. Optionally, the first direction is perpendicular to the extension direction of the sample loading device in the sample introduction apparatus, the lifting assembly 122 can drive the push plate 110 to ascend to a first position higher than the bottom wall of the sample loading device and abut against the sample holders located in the sample loading device, so as to drive the sample holders to move in a linkage motion in the second direction. Moreover, the lifting assembly 122 can also drive the push plate 110 to descend to a second position lower than the bottom wall of the sample loading device, such that during the returning of the push plate 110, the push plate 110 can descend to the lower portion of the sample loading device by means of the lifting structure 120, such that the push plate 110 is not in contact with the sample holder placed in the sample loading device so as to prevent the sample holder advancing mechanism 100 from colliding with the newly additionally placed sample holder during the returning, thereby ensuring the reliability and safety of sample introduction. Moreover, by means of providing a lifting structure 120 on the sample holder advancing mechanism 100, the user can additionally place a new sample holder into the sample loading device without pausing the sample holder advancing mechanism 100, which can realize continuous sample introduction and is convenient to use.

Figure 2:
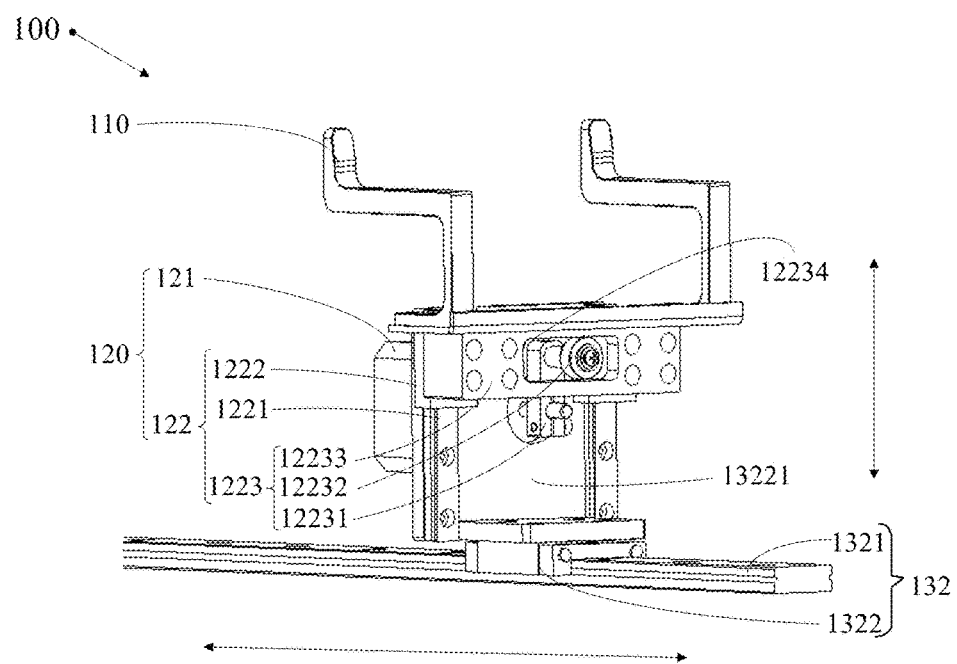
FIG. 2 is a schematic structural diagram of a sample holder advancing mechanism in an embodiment.
Figure 3:
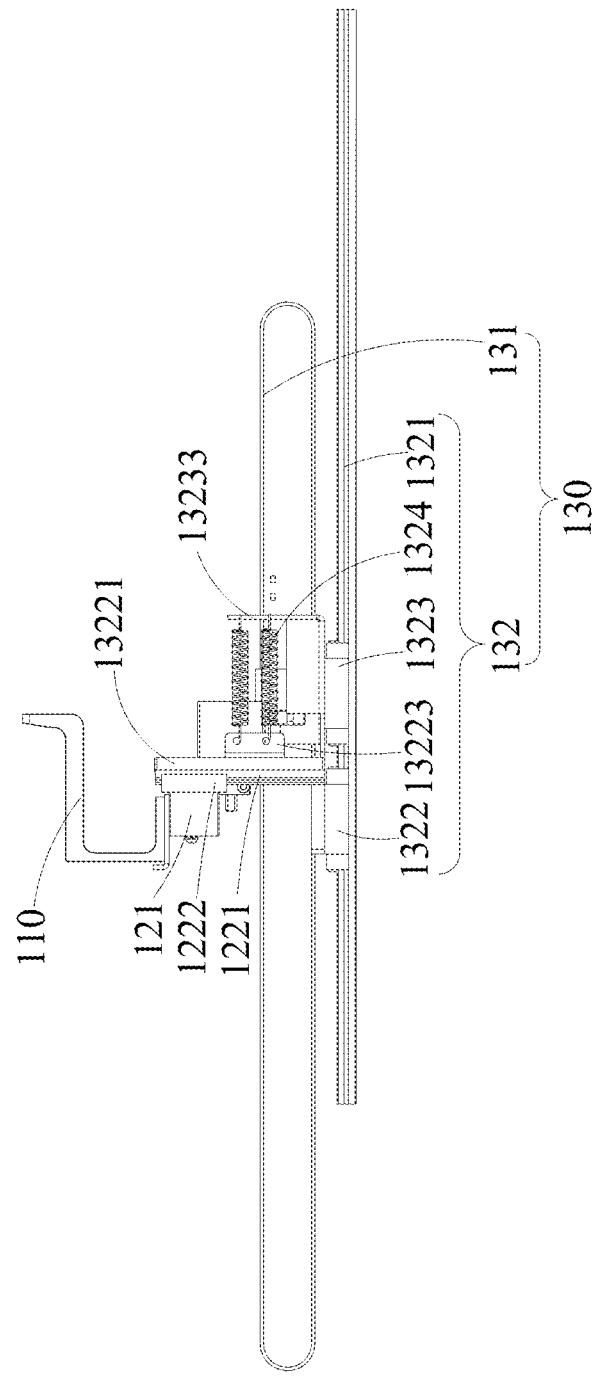
FIG. 3 is a side view of a sample holder advancing mechanism in an embodiment.

As shown in FIGS. 2 and 3, the advancing structure 130 may comprise a second driving component 131 and an advancing assembly 132, the lifting assembly 122 is arranged on the advancing assembly 132, and the second driving component 131 can drive the advancing assembly 132 to drive the lifting assembly 122 and the push plate 110 to move in a reciprocating motion in the second direction perpendicular to the first direction. As shown in FIG. 2, the second direction may be a horizontal direction, the advancing assembly 132 may be arranged in the horizontal direction, and the second driving component 131 can drive the advancing assembly 132 to move in a reciprocating motion in the horizontal direction, such that the advancing assembly 132 drives the lifting assembly 122 and the push plate 110, which are arranged thereon, to move in the horizontal direction. Optionally, the second direction is consistent with the extension direction of the sample loading device in the sample introduction apparatus. In this way, by means of the movement of the advancing assembly 132, the sample holder in the sample loading device may be pushed from the initial position to the inside of the sample analysis device.

The control device is used for, during the movement of the push plate 110 in the direction from the initial position to the limiting position, controlling the push plate 110 to be located in the first position higher than the bottom wall of the sample loading device 200 so as to drive the sample holders between the current position of the push plate 110 and the limiting position to move synchronously; and during the movement of the push plate 110 in the direction from the limiting position to the initial position, controlling the push plate 110 to be located in the second position lower than the bottom wall of the sample loading device, the push plate 110 being in no contact with the sample holder located in the sample loading device. In this way, during the returning of the push plate 110 from the limiting position to the initial position, it is possible to prevent the sample holder advancing mechanism 100 from colliding with the additionally placed sample holder during the returning, thereby ensuring the reliability and safety of sample introduction. Moreover, by means of providing a lifting structure 120 on the sample holder advancing mechanism 100, the user can additionally place a new sample holder into the sample loading device without pausing the sample holder advancing mechanism 100, which can realize continuous sample introduction and is convenient to use.

Optionally, as shown in FIG. 2, the lifting assembly 122 may comprise a lifting guide component 1221, a lifting sliding component 1222, and a transmission component 1223. Both the first driving component 121 and the lifting guide component 1221 are arranged on the advancing assembly 132, and the extension direction of the lifting guide component 1221 is consistent with the first direction. Optionally, the first driving component 121 may be an electric motor, etc., and by means of using an electric motor as the driving component, the lifting assembly may have a small volume, and is convenient for integration and installation. Optionally, the lifting guide component 1221 may be such as a linear guide rail, a linear bearing, or a guide post. In one embodiment of the present application, the lifting guide component 1221 is a linear guide rail, the lifting sliding component 1222 is a slider arranged on the linear guide rail, and the lifting sliding component 1222 can move on the lifting guide component 1221 in the first direction. The first driving component 121 is connected to the transmission component 1223, and the first driving component 121 can drive the transmission component 1223 to rotate. The transmission component 1223 is connected to the lifting sliding component 1222, the lifting sliding component 1222 is located on the lifting guide component 1221, and the transmission component 1223 can drive the lifting sliding component 1222 to move in a reciprocating motion in the first direction. The push plate 110 is arranged on the lifting sliding component 1222, such that the lifting sliding component 1222 can drive the push plate 110 to move synchronously in the first direction.

Further, the number of the lifting guide component 1221 may be two, and the two lifting guide components 1221 are arranged oppositely at a certain distance on advancing assembly 132. For example, as shown in FIG. 1, the two lifting guide components 1221 may be symmetrically arranged with respect to the advancing assembly 132. Accordingly, the number of the lifting sliding component 1222 may also be two, the two lifting sliding components 1222 are respectively arranged on the two lifting guide components 1221, and the two lifting sliding component 1222 move in a linkage motion. One end of the push plate 110 is arranged on one of the lifting sliding components 1222, and the other end of the push plate 110 is arranged on the other lifting sliding component 1222.

In an embodiment, the transmission component 1223 may comprise a rotating arm 12231, a rolling wheel 12232, and a transmission guide portion 12233 arranged on the lifting sliding component 1222, and the transmission guide portion 12233 is provided with a guide slot 12234 that can accommodate the rolling wheel 12232. For example, the guide slot 12234 may be a rectangular slot, the width of the guide slot 12234 may be equal to the diameter of a tubular wheel, and the length of the guide slot 12234 may be set according to the angle of rotation of the rotating arm 12231.

One end of the rotating arm 12231 is arranged on an output shaft of the first driving component 121, the first driving component 121 can drive the rotating arm 12231 to rotate, the rolling wheel 12232 is arranged on the other end of the rotating arm 12231, and the rolling wheel 12232 is fitted in the guide slot 12234 in a rolling manner. When the first driving component 121 drives the rotating arm 12231 to rotate, the rotating arm 12231 can drive the rolling wheel 12232 to move in the guide slot 12234, such that the transmission guide portion 12233 and the lifting sliding component 1222 move synchronously in the first direction. As shown in FIG. 1, when the first driving component 121 drives the rotating arm 12231 to rotate clockwise, the rotating arm 12231 can drive the rolling wheel 12232 to move from the current position to an end wall on a right side of the guide slot 12234, such that the transmission guide portion 12233 and the lifting sliding component 1222 can move downward, which in turn can drive the push plate 110 to move downward. When the first driving component 121 drives the rotating arm 12231 to rotate counterclockwise, the rotating arm 12231 can drive the rolling wheel 12232 to move from the current position to an end wall on a left side of the guide slot 12234, such that the transmission guide portion 12233 and the lifting sliding component 1222 can move upward, which in turn can drive the push plate 110 to move upward.

Further, the output shaft of first driving component is arranged offset relative to the central axis of the guide slot; when the first driving component drives the lifting assembly to drive the push plate to move in the first direction toward the advancing structure, the rotating arm can abut against the end wall of the guide slot; wherein the central axis of the guide slot is parallel to the first direction. In this way, the rotation of the rotating arm 12231 can be limited by means of setting the length of the guide slot 12234 so as to achieve the self-locking function of the lifting assembly 122. That is, when the first driving component drives the lifting assembly to drive the push plate to move downward in the first direction, the rotating arm rotates to a position perpendicular to the extension direction of the guide slot, and the rotating arm further rotates by a certain angle and then abuts against the end wall of the guide slot. As such, when the lifting mechanism is powered off, the rotating arm 12231 is already in a position in which the rotating arm abuts against the end wall of the guide slot 12234, and the rotating arm 12231 will not continue to rotate to drive the push plate 110 to move, such that the power-off self-locking function of the lifting structure 120 can be achieved by means of limiting the angle of rotation of the rotating arm 12231.

In an embodiment, the transmission component 1223 may comprise a rotary wheel, a rolling wheel 12232, and a transmission guide portion 12233 arranged on the lifting sliding component 1222, and the transmission guide portion 12233 is provided with a guide slot 12234 that can accommodate the rolling wheel 12232; the rotary wheel is connected to the first driving component 121, and the first driving component 121 can drive the rotary wheel to rotate; and the rolling wheel 12232 is arranged on the rotary wheel, the rolling wheel 12232 is fitted in the guide slot 12234 in a rolling manner, and the rotary wheel can drive the rolling wheel 12232 to move in the guide slot 12234 to enable the lifting sliding component 1222 to move in the first direction. Optionally, the length of the guide slot 12234 can be set according to the angle of rotation of the rotating arm 12231, such that the rotation of the rotating arm 12231 can be limited by means of setting the length of the guide slot 12234 so as to achieve the self-locking function of the lifting assembly 122.

In an embodiment, the transmission component 1223 may be a screw rod, or the transmission component 1223 is of a synchronous belt transmission structure, or the transmission component 1223 is of a gear transmission structure. For example, when the transmission component 1223 is a screw rod, the first driving component 121 may be connected to a rod-shaped portion of the screw rod, the lifting sliding component 1222 may be connected to a ball arranged on the rod-shaped portion, and when the first driving component 121 drives the rod-shaped portion to rotate, the ball can drive the lifting sliding component 1222 to move in a lifting motion. For another example, the transmission component 1223 may be of a synchronous belt transmission structure. The synchronous belt transmission structure may comprise two synchronous belt wheels and a synchronous belt, the two synchronous belt wheels are arranged in the extension direction of the lifting guide component 1221, the synchronous belt is sheathed over the two synchronous belt wheels, and the first driving component 121 can drive the synchronous belt to move by means of the synchronous belt wheels. The lifting sliding component 1222 may be arranged on the synchronous belt, such that the lifting sliding component 1222 can drive the push plate 110 to move in a lifting motion. For still another example, the transmission component 1223 may be of a gear transmission structure, and the gear transmission structure may comprise a gear connected to the first driving component 121 and a rack engaged with the gear, the rack may be arranged in the first direction, and the lifting sliding component 1222 may be arranged on the rack. In this way, when the first driving component 121 drives the gear to rotate, the gear can drive the rack to move, such that the rack drives the lifting sliding component 1222 provided thereon to move synchronously. Only some implementation manners are exemplarily illustrated here, which do not specifically define the structure.

Figure 4:
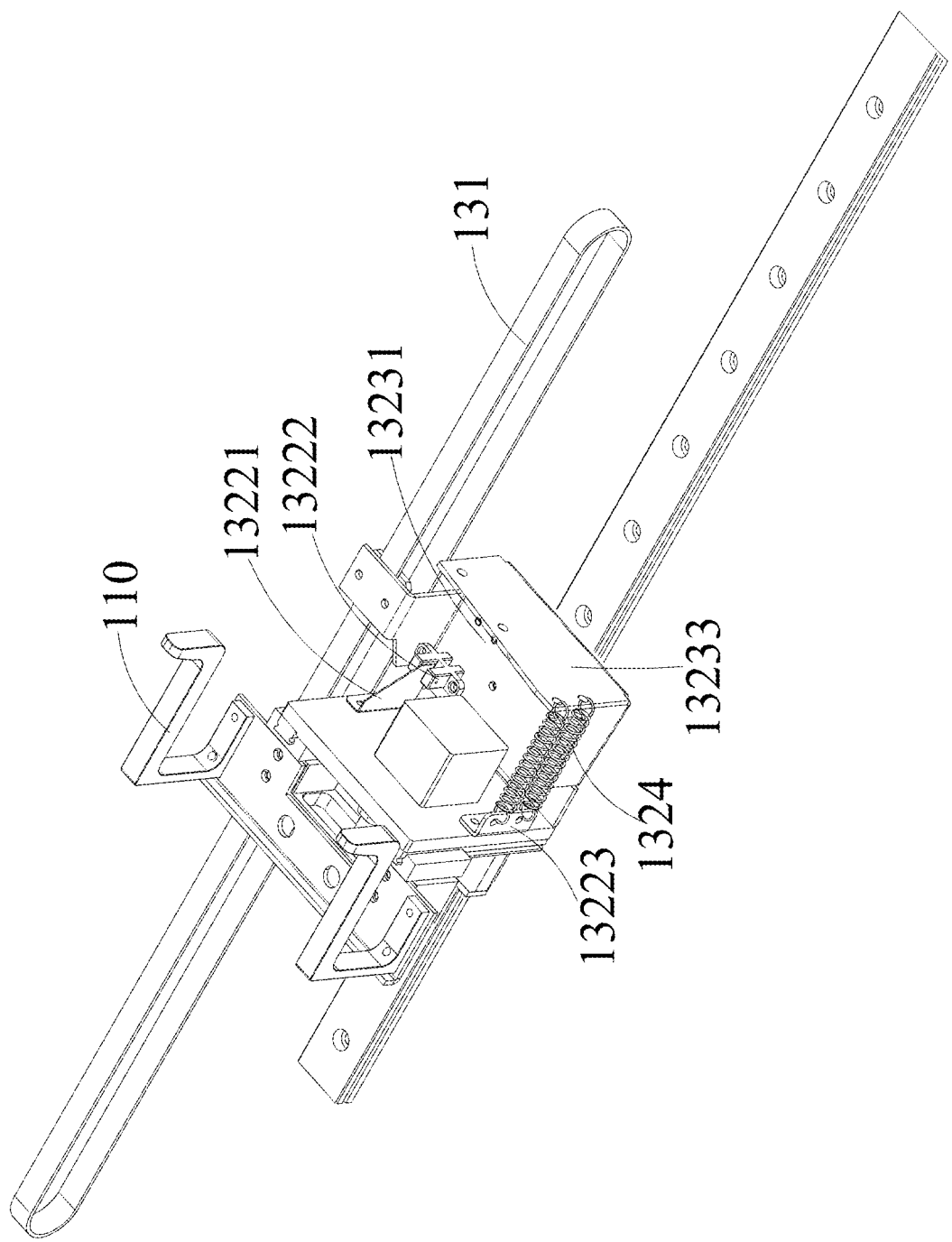
FIG. 4 is a schematic structural diagram of a sample holder advancing mechanism in a first state of motion in an embodiment.
Figure 5:
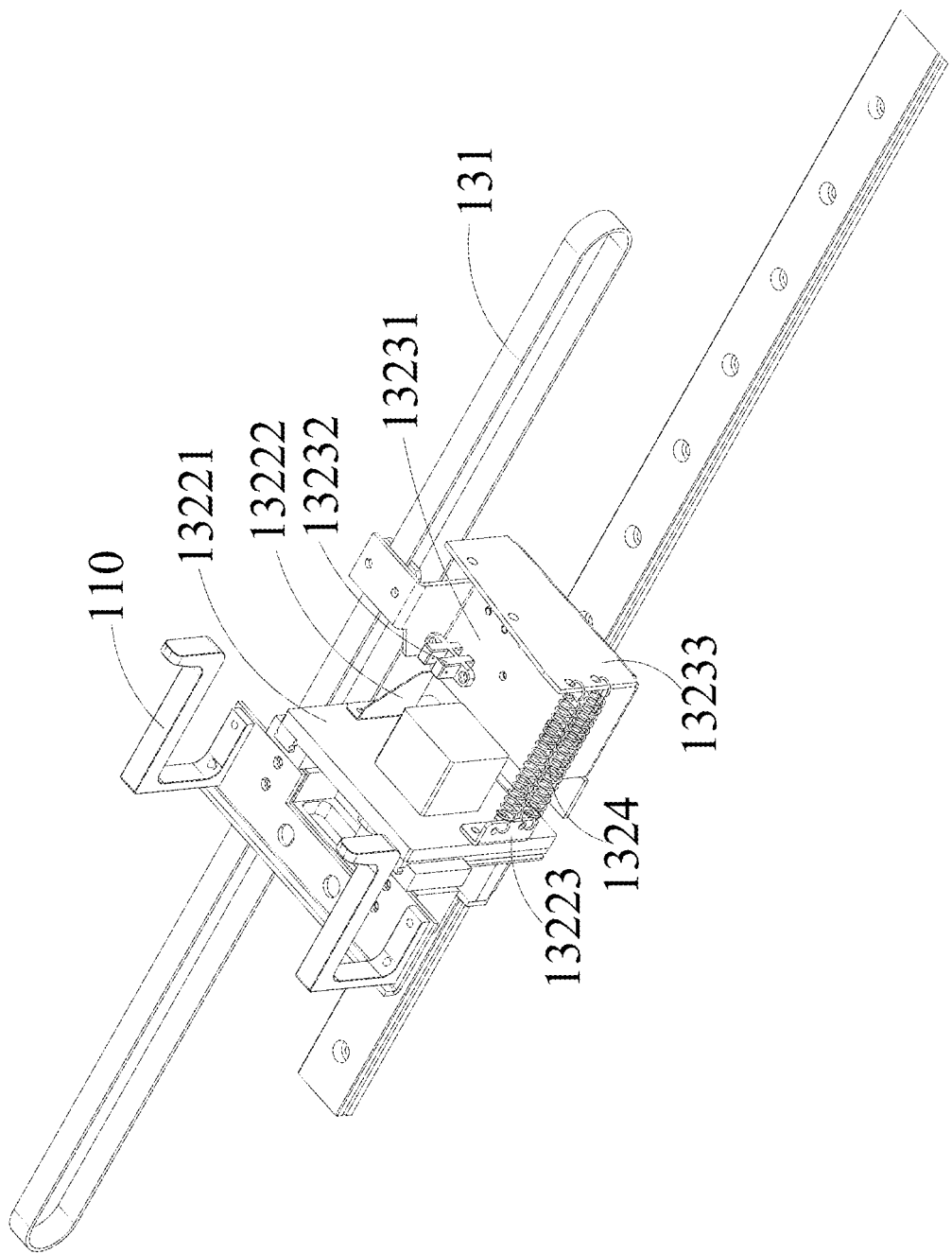
FIG. 5 is a schematic structural diagram of a sample holder advancing mechanism in a second state of motion in an embodiment.

In an embodiment, as shown in FIGS. 3 to 5, the advancing assembly 132 may comprise an advancing guide component 1321, a first sliding component 1322 and a second sliding component 1323 arranged on the advancing guide component 1321, and a flexible connecting member 1324. The flexible connecting member 1324 has a telescopic function. For example, the flexible connecting member 1324 may be a compression spring or a tension spring.

The first sliding component 1322 is provided with a support base 13221, and the lifting assembly 122 is arranged on the support base 13221. Specifically, both the first driving component 121 and the lifting guide component 1221 are arranged on the support base 13221. The second sliding component 1323 is connected to the second driving component 131, the second driving component 131 can drive the second sliding component 1323 to move in the second direction, and the second sliding component 1323 is connected to the support base 13221 or the first sliding component 1322 via the flexible connecting member 1324, such that the second sliding component 1323 can drive the first sliding component 1322 as well as the lifting assembly 122 and the push plate 110 provided thereon to move in a linkage motion in the second direction. Optionally, the second driving component 131 may be of a synchronous belt driving structure. The second sliding component 1323 may be connected to a conveyor belt via a sliding connection portion, and the conveyor belt can drive the second sliding component 1323 to move. Of course, in other embodiments, the second driving component 131 may also be of a structure such as an electric motor or a pneumatic cylinder.

The second sliding component 1323 is provided with a first detection element 13232, the support base 13221 is provided with a second detection element 13222 corresponding to the first detection element 13232, and when the push plate 110 moves to the target position, the connection relationship of the first detection element 13232 and the second detection element 13222 is switched from the first state to the second state; wherein the first state is an engaged state, and the second state is a disengaged state; or the first state is a disengaged state, and the second state is an engaged state. Optionally, the first detection element 13232 may be a signal emission element, such as a sensor, arranged on the pedestal 13231; and the second detection element 13222 is a signal detection element, such as a shutter or a sensing chip, arranged on one side of the support base 13221 facing the second sliding component 1323. Alternatively, the first detection element 13232 is a signal detection element, such as a shutter or a sensing chip, arranged on the pedestal 13231; and the second detection element 13222 is a signal emission element, such as a sensor, arranged on one side of the support base 13221 facing the second sliding component 1323. When the push plate 110 moves to the target position, the connection relationship between the signal detection element and the signal emission element is switched from the first state to the second state. It should be clear that the target position of the push plate 110 here may be the limiting position of the push plate 110, or may also be the current position of the push plate 110 when the foremost sample holder between the push plate 110 and the sample analysis device moves to the limiting position. That is, the target position of the push plate 110 refers to the position in which the push plate 110 cannot continue to move forward. The limiting position is located at one end of the sample loading device connected to a sample analysis device, and the initial position is located at the end opposite the limiting position.

Optionally, the signal emission element may also be a through-beam sensor, and the signal detection element may be a shutter that can be inserted into the through-beam sensor. Of course, in other embodiments, the signal emission element may also be a distance sensor, and the signal detection element may be a sensing chip cooperating with the distance sensor. Alternatively, the signal emission element may also be a pressure sensor, and the signal detection element may also be a sensing chip cooperating with the pressure sensor. Only some implementation manners are exemplarily illustrated here, which do not specifically define the structure.

Optionally, the support base 13221 is further provided with a first mounting portion 13223, the second sliding component 1323 is provided with a pedestal 13231, the pedestal 13231 is provided with a second mounting portion 13233, one end of the flexible connecting member 1324 is connected to the first mounting portion 13223, and the other end of the flexible connecting member 1324 is connected to the second mounting portion 13233. Optionally, the flexible connecting member 1324 is a tension spring or a compression spring.

The working mode of the advancing structure 130 will be illustrated with an example below.

For example, the flexible connecting member 1324 is a tension spring, the first detection element 13232 is a shutter arranged on the support base 13221, and the second detection element 13222 is a through-beam sensor arranged on the pedestal 13231. During the movement of the second sliding component 1323 driven by the second driving component 131 toward the position in which the sample analysis device is located, the first sliding component 1322 and the second sliding component 1323 move synchronously, and the first detection element 13232 comes into contact with the second detection element 13222, that is, the shutter is inserted into the through-beam sensor, as shown in FIG. 3. When the first sliding component 1322 drives the push plate 110 to move to the target position, the movement of the push plate 110 is blocked and cannot continue to move in the direction in which the sample analysis device is located. Then, the second sliding component 1323 can be driven by the second driving component 131 to continue to move, such that the first detection element 13232 is separated from the second detection element 13222, as shown in FIG. 4, and then there will be a signal jump of the sensor. As such, it can be determined whether the push plate 110 moves to the target position according to the state of the first detection element 13232 and the second detection element 13222.

For another example, the flexible connecting member 1324 is a compression spring, the first detection element 13232 is a shutter arranged on the support base 13221, and the second detection element 13222 is a through-beam sensor arranged on the pedestal 13231. During the movement of the second sliding component 1323 driven by the second driving component 131 toward the position in which the sample analysis device is located, the first sliding component 1322 and the second sliding component 1323 move synchronously, and the first detection element 13232 is separated from the second detection element 13222, as shown in FIG. 4. When the first sliding component 1322 drives the push plate 110 to move to the target position, the movement of the push plate 110 is blocked and cannot continue to move in the direction in which the sample analysis device is located. Then, the second sliding component 1323 can be driven by the second driving component 131 to continue to move, such that the first detection element 13232 is fitted to the second detection element 13222 in an insertion manner, as shown in FIG. 3, and then there will be a signal jump of the sensor. As such, it can be determined whether the push plate 110 moves to the target position according to the state of the first detection element 13232 and the second detection element 13222.

In the traditional technology, a sensor is usually installed in the target position to detect whether the push plate 110 or the sample holder is in place. However, there are errors in the installation and induction of a single sensor, easily leading to inaccurate detection results. In one embodiment of the present application, by means of providing the first detection element 13232 on the second sliding component 1323, providing the second detection element 13222 on the first sliding component 1322, and connecting the first sliding component 1322 and the second sliding component 1323 by means of the flexible connecting member 1324, the accuracy and sensitivity of the positioning detection for the push plate 110 can be improved, and the damage of the sample holder can be prevented.

In an embodiment, the sample holder advancing mechanism 100 may comprise a pushing portion and an advancing structure, the advancing structure is arranged in the extension direction of the sample loading device, and the advancing structure can drive the pushing portion to move in a reciprocating motion between the initial position and the limiting position. Optionally, the advancing structure may be selected as the advancing structure in the embodiment described above. Optionally, the number of the pushing portion may be one. For example, the pushing portion may be a push rod on one side of the sample loading device, and the extension direction of the push rod is consistent with the width direction of the sample loading device. The pushing portion can rotate to enable the pushing portion to be located in a first position parallel to the bottom wall of the sample loading device and in a second position having a certain angle with the bottom wall of the sample loading device. For example, the second position is a position perpendicular to the bottom wall of the sample loading device. In this way, when the pushing portion is located in the first position, the pushing portion can abut against the side wall of the sample holder placed in the sample loading device, so as to enable the pushing portion to drive the sample holder to move, such that the sample holder between the current position of the pushing portion and the limiting position is pushed into the sample analysis device. When the pushing portion is located in the second position, the pushing portion does not come into contact with the sample holder placed in the sample loading device. In this way, during the movement of the sample holder advancing mechanism from the initial position to the limiting position, the pushing portion can be controlled to be located in the first position; and during the movement of the sample holder advancing mechanism from the limiting position to the initial position, the pushing portion can be controlled to be located in the second position.

Further, the number of the pushing portion may be two, and the two push rods are respectively arranged on two sides of the sample loading device. Each of the pushing portions can rotate to enable the pushing portion to be located in a first position parallel to the bottom wall of the sample loading device and in a second position having a certain angle with the bottom wall of the sample loading device. For example, the second position is a position perpendicular to the bottom wall of the sample loading device. In this way, when the pushing portion is located in the first position, the pushing portion can abut against the side wall of the sample holder placed in the sample loading device, so as to enable the pushing portion to drive the sample holder to move, such that the sample holder between the current position of the pushing portion and the limiting position is pushed into the sample analysis device. When the pushing portion is located in the second position, the pushing portion does not come into contact with the sample holder placed in the sample loading device. In this way, during the movement of the sample holder advancing mechanism from the initial position to the limiting position, the two pushing portions can be controlled to be located in the first position; and during the movement of the sample holder advancing mechanism from the limiting position to the initial position, the two pushing portions can be controlled to both be located in the second position.

Optionally, the sample introduction apparatus further comprises an initial position detection element for detecting whether the pushing portion reaches the initial position, and a limiting position detection element for detecting whether the pushing portion reaches the limiting position. Both the initial position detection element and the limiting position detection element are connected to the control device. Optionally, the initial position detection element may be a sensor arranged in the initial position, and the limiting position detection element is a sensor arranged in the limiting position. Optionally, when the advancing structure uses the advancing structure in the above embodiment, if the limiting position sensor detects the second sliding component 1323, the control device can determine that the pushing portion has moved to the limiting position according to the sensing signal transferred by the limit sensor, and then, the control device can control the pushing portion to return in the direction from the limiting position to the initial position.

Optionally, the control device can control the push plate 110 to return in the direction from the limiting position to the initial position until the push plate 110 moves to the initial position. Also, after the push plate 110 moves a preset distance or for a preset period of time in the direction from the limiting position to the initial position, the control device can control the first driving component 121 to drive the lifting assembly 122 to move so as to enable the push plate 110 to be located in the second position lower than the bottom wall of the sample loading device. In this way, after the push plate 110 moves a preset distance or for a preset period of time in the direction from the limiting position to the initial position, the push plate 110 and the limiting position are spaced by a distance for hiding the push plate 110, ensuring that the push plate 110 can move to the second position.

In an embodiment, the number of the sample loading device may be more than two, and the lower portion of each sample loading device is correspondingly provided with a sample holder advancing mechanism 100. The control device is further used for, when the push plate 110 moves from the limiting position to the initial position, controlling the first driving component 121 to drive the lifting assembly 122 to move so as to enable the push plate 110 to be located in the first position higher than the bottom wall of the sample loading device, and control the second driving component 131 again to drive the advancing assembly 132 and the push plate 110 to move in the direction from the initial position to the limiting position; and if it is detected that the current position of the push plate 110 of the current sample holder advancing mechanism 100 is the limiting position in more than two consecutive detections, controlling the push plate 110 of the current sample holder advancing mechanism 100 to pause in the safety position, obtaining a sample introduction trigger signal of the next sample holder advancing mechanism, and controlling the next sample holder advancing mechanism to start moving according to the sample introduction trigger signal of the next sample holder advancing mechanism. That is, if it is detected that the push plate 110 of the current sample holder advancing mechanism 100 moves to the limiting position in more than two consecutive detections, the push plate 110 of the current sample holder advancing mechanism 100 is controlled to pause in the safety position, and the push plate 110 of the next sample holder advancing mechanism 100 is controlled to move to the initial position; and then the push plate 110 of the next sample holder advancing mechanism 100 is controlled to move to the first position higher than the bottom wall of the next sample loading device, and the push plate 110 of the next sample holder advancing mechanism 100 is controlled to move from the initial position to the limiting position.

Optionally, the next sample holder advancing mechanism 100 may be automatically selected by the control device. For example, the control device can automatically select the next sample holder advancing mechanism 100 in the order of arrangement of the sample loading devices. Specifically, the control device is further used for, when the push plate of the current sample holder advancing mechanism stops in the safety position, switching the state of motion of the current sample holder advancing mechanism from the sample introduction state to the pause state, and obtaining the sample introduction trigger signal of the next sample holder advancing mechanism according to the pause state of the current sample holder advancing mechanism.

Optionally, the next sample holder advancing mechanism 100 may also be manually set. Specifically, each of the sample holder advancing mechanisms 100 is correspondingly provided with one signal trigger device to control the corresponding sample holder advancing mechanism 100 to move, and each signal trigger device is connected to the control device. The signal trigger device may be a start button arranged on the sample introduction apparatus, and may also be a touch control arranged on the interaction display device, such as a start button displayed on a touch panel. Optionally, the sample loading device is further provided with a movable carrying device, such as a basket, for placing a sample holder, and each of the sample loading devices is provided with a loading detection device for detecting the movable carrying device; and the signal trigger device is the loading detection device. That is, when the loading detection device detects that the movable carrying device is placed in the sample loading device, a sample introduction trigger signal of the sample holder advancing mechanism corresponding to the sample loading device can be generated.

The control device is further used for, when the current sample holder advancing mechanism is in the sample introduction state, if other sample introduction trigger signals are received, updating respective states of sample holder advancing mechanisms corresponding to the other sample introduction trigger signals to a sample introduction ready state; and when the pushing portion of the current sample holder advancing mechanism stops at the safety position, selecting any one of the other sample introduction trigger signals as the sample introduction trigger signal of the next sample holder advancing mechanism.

Specifically, when the control device receives the sample introduction trigger signal of the current sample holder advancing mechanism 100, and the other sample holder advancing mechanisms 100 are all in the pause state, the lifting structure 120 of the current sample holder advancing mechanism 100 is controlled to drive the push plate 110 to move to the first position higher than the bottom wall of the current sample loading device, and the advancing structure 130 of the current sample holder advancing mechanism 100 is controlled to drive the push plate 110 of the current sample holder advancing mechanism 100 to move in the direction from the initial position to the limiting position, so as to start the sample introduction of the current sample holder advancing mechanism 100. When the sample introduction trigger signal of the current sample holder advancing mechanism 100 is received, and at least one of the other sample holder advancing mechanisms 100 is in the sample introduction state, after the sample holder advancing mechanism 100 in the sample introduction state is switched to the pause state, the lifting structure 120 of the current sample holder advancing mechanism 100 is then controlled to drive the push plate 110 to move to the first position higher than the bottom wall of the sample loading device, and the advancing structure 130 of the current sample holder advancing mechanism 100 is controlled to drive the push plate 110 of the current sample holder advancing mechanism 100 to move in the direction from the initial position to the limiting position, so as to start the sample introduction of the current sample holder advancing mechanism 100.

The control device is further used for, when the sample introduction trigger signal of the current sample holder mechanism is received, controlling the advancing structure of the current sample holder advancing mechanism to drive the push plate to move to the initial position, controlling the lifting structure of the current sample holder advancing mechanism to drive the push plate to move to the first position higher than the bottom wall of the sample loading device, and controlling the advancing structure of the current sample holder advancing mechanism to drive the push plate of the current sample holder advancing mechanism to move in the direction from the initial position to the limiting position.

The working process of the sample introduction apparatus of one embodiment of the present application will be illustrated below with reference to the drawings.

A user can trigger a start button corresponding to the current sample holder advancing mechanism 100 to control the current sample holder advancing mechanism to start moving, and then the current sample holder advancing mechanism is in the sample introduction state. The start button corresponding to the current sample holder advancing mechanism 100 may be a button arranged on the sample introduction apparatus, and may also be a touch control arranged on an interaction display device, such as a touch button displayed on a display. Of course, in other embodiments, the placement or removal of the movable carrying device may also be used as the sample introduction trigger signal of the current sample holder advancing mechanism 100.

The control device may control the current sample holder advancing mechanism 100 to move to the initial position according to the received sample introduction trigger signal. Then, the control device controls the lifting structure 120 to drive the push plate 110 to move to the first position higher than the bottom wall of the sample loading device to enable the push plate 110 to abut against the side wall of the sample holder located between the push plate 110 and the limiting position, so as to drive the sample holders between the current position of the push plate 110 and the limiting position to move synchronously. Moreover, the control device can control the advancing structure 130 to drive the push plate 110 to move in the direction from the initial position to the limiting position.

During the movement of the push plate 110 driven by the advancing structure 130 in the direction from the initial position to the limiting position, the control device can obtain the connection state of the first detection element 13232 and the second detection element 13222 in real time, and when the connection state of the first detection element 13232 and the second detection element 13222 is switched from the first state to the second state, determine that the foremost sample holder located between the current position of the push plate 110 and the limiting position moves to the limiting position. Then, the control device can control the push plate 110 to move a preset distance from the current position to the initial position, such that there is a gap between the foremost sample holder and the other sample holder or push plate 110, so as to push the foremost sample holder into the sample analysis device. Optionally, the preset distance may be greater than or equal to the width of one sample holder. The preset distance may be greater than or equal to the width of the push plate 110, which is not specifically limited here. After the foremost sample holder is pushed to the sample analysis device, the control device can continue to control the pushing assembly to drive the push plate 110 to move to the limiting position until the position detection signal of the second sliding component 1323 is detected. When the control device receives the position detection signal of the second sliding component 1323 transmitted by the limiting position sensor, the control device can determine that the push plate 110 has moved to the limiting position, and there is no sample holder between the push plate 110 and the limiting position, that is, the push plate 110 has pushed all the sample holders into the sample analysis device.

When the control device determines that the current position of the push plate 110 is the limiting position, that is, the control device determines that the push plate 110 has pushed all the sample holders into the sample analysis device, the control device can control the second driving component 131 to drive the advancing assembly 132 to move in the direction from the limiting position to the initial position, and after the push plate 110 moves a preset distance or for a preset period of time in the direction from the limiting position to the initial position, the control device can control the first driving component 121 to drive the lifting assembly 122 to move so as to enable the push plate 110 to be located in the second position lower than the bottom wall of the sample loading device until the push plate 110 returns to the initial position. Specifically, during the movement of the push plate 110 driven by the advancing structure 130 in the direction from the limiting position to the initial position, the control device controls the lifting structure 120 to drive the push plate 110 to move to the second position lower than the bottom wall of the sample loading device, and the push plate 110 is not in contact with the sample holder in the sample loading device.

Optionally, when the push plate 110 returns from the limiting position to the initial position, the control device controls the first driving component 121 to drive the lifting assembly 122 to move so as to enable the push plate 110 to be located at the first position higher than the bottom wall of the sample loading device, and control the second driving component 131 again to drive the advancing assembly 132 and the push plate 110 to move in the direction from the initial position to the limiting position. That is, when the push plate 110 returns from the limiting position to the initial position, the control device controls the push plate 110 to perform the secondary pushing operation. Then, if there are sample holders between the current position of the push plate 110 and the limiting position, the push plate 110 can sequentially push the sample holders into the sample analysis device. The specific movement process is as described above.

If there is no sample holder between the current position of the push plate 110 and the limiting position, the push plate 110 will then directly move to the limiting position, and the limiting position sensor can detect the push plate 110 in two consecutive detections. Therefore, if it is detected that the current position of the push plate 110 is the limiting position in more than two consecutive detections, the control device can control the push plate 110 of the sample holder advancing mechanism 100 to pause at the safety position, and the current sample holder advancing mechanism 100 is switched from the sample introduction state to the pause state.

In an embodiment, the number of the sample loading device may be more than two, and each sample loading device is correspondingly provided with a sample holder advancing mechanism 100. Each sample holder advancing mechanism is provided with a corresponding signal trigger device. The signal trigger device corresponding to each sample holder advancing mechanism 100 may be a start button arranged on the sample introduction apparatus, and may also be a touch control arranged on an interaction display device, such as a touch button displayed on a display. Of course, in other embodiments, the placement or removal of the movable carrying device may also be used as the sample introduction trigger signal of the current sample holder advancing mechanism 100. The working process of the sample introduction apparatus will be illustrated below taking a sample introduction apparatus including two sample loading device as an example.

A user can trigger a signal trigger device corresponding to the first sample holder advancing mechanism 100, and control the first sample holder advancing mechanism to start moving so as to start automatic sample introduction. Then, the control device may control the first sample holder advancing mechanism 100 to move to the initial position according to the received sample introduction trigger signal. The control device control the lifting structure 120 of the first sample holder advancing mechanism to drive the push plate 110 thereon to move to the first position higher than the bottom wall of the sample loading device corresponding to the first sample holder advancing mechanism 100, such that the push plate 110 of the first sample pushing mechanism can abut against the side wall of the sample holder located between the push plate 110 of the first sample holder advancing mechanism 100 and the limiting position to drive the sample holders located between the current position of the push plate 110 and the limiting position to move synchronously. Moreover, the control device can control the advancing mechanism of the first sample holder advancing mechanism 100 to drive the push plate 110 to move in the direction from the initial position to the limiting position.

During the movement of the push plate 110 driven by the advancing structure 130 of the first sample holder advancing mechanism 100 in the direction from the initial position to the limiting position, the control device can obtain the connection state of the first detection element 13232 and the second detection element 13222 of the first sample holder advancing mechanism 100 in real time, and when the connection state of the first detection element 13232 and the second detection element 13222 of the first sample holder advancing mechanism 100 is switched from the first state to the second state, determine that the foremost sample holder located between the current position of the push plate 110 and the limiting position of the first sample holder advancing mechanism 100 moves to the limiting position. Then, the control device can control the push plate 110 of the first sample holder advancing mechanism 100 to move for a preset distance from the current position to the initial position, such that there is a gap between the foremost sample holder and a further sample holder or the push plate 110, so that the foremost sample holder can be pushed into the sample analysis device. Optionally, the preset distance may be greater than or equal to the width of one sample holder. The preset distance may be greater than or equal to the width of the push plate 110, which is not specifically limited here. After the foremost sample holder is pushed into the sample analysis device, the control device can continue to control the pushing assembly of the first sample holder advancing mechanism 100 to drive the push plate 110 to move toward the limiting position until the position detection signal of the second sliding component 1323 of the first sample holder advancing mechanism 100 is detected. When the control device receives the position detection signal of the second sliding component 1323 transmitted by the limiting position sensor of the first sample holder advancing mechanism 100, the control device can determine that the push plate 110 of the first sample holder advancing mechanism 100 has moved to the limiting position, and there is no sample holder between the push plate 110 and the limiting position, that is, the push plate 110 has pushed all the sample holders into the sample analysis device.

When the control device determines that the current position of the push plate 110 of the first sample holder advancing mechanism 100 is the limiting position, that is, the control device determines that the push plate 110 of the first sample holder advancing mechanism 100 has pushed all the sample holders into the sample analysis device, the control device can control the second driving component 131 of the first sample holder advancing mechanism 100 to drive the advancing assembly 132 to move in the direction from the limiting position to the initial position. After the push plate 110 of the first sample holder advancing mechanism 100 moves for a preset distance or for a preset period of time in the direction from the limiting position to the initial position, the control device can control the first driving component 121 of the first sample holder advancing mechanism 100 to drive the lifting assembly 122 to move so as to enable the push plate 110 of the first sample holder advancing mechanism 100 to be located at the second position lower than the bottom wall of the sample loading device. During the movement of the push plate 110 driven by the advancing structure 130 of the first sample holder advancing mechanism 100 in the direction from the limiting position to the initial position, the control device controls the lifting structure 120 of the first sample holder advancing mechanism 100 to drive the push plate 110 to move to the second position lower than the bottom wall of the sample loading device, and the push plate 110 of the first sample holder advancing mechanism 100 is not in contact with the sample holder in the sample loading device.

Optionally, when the push plate 110 of the first sample holder advancing mechanism 100 returns from the limiting position to the initial position, the control device can control the first driving component 121 of the first sample holder advancing mechanism 100 to drive the lifting assembly 122 to move so as to enable the push plate 110 of the first sample holder advancing mechanism 100 to be located in the first position higher than the bottom wall of the sample loading device, and control the second driving component 131 of the first sample holder advancing mechanism 100 again to drive the advancing assembly 132 and the push plate 110 to move in the direction from the initial position to the limiting position. That is, when the push plate 110 of the first sample holder advancing mechanism 100 returns from the limiting position to the initial position, the control device can control the push plate 110 of the first sample holder advancing mechanism 100 to perform the secondary pushing operation. Then, if there are sample holders between the current position of the push plate 110 and the limiting position of the first sample holder advancing mechanism 100, the push plate 110 of the first sample holder advancing mechanism 100 can sequentially push the sample holders into the sample analysis device. The specific movement process is as described above.

If there is no sample holder between the current position of the push plate 110 and the limiting position of the first sample holder advancing mechanism 100, the push plate 110 of the first sample holder advancing mechanism 100 will then directly move to the limiting position, and the limiting position sensor can detect the push plate 110 in two consecutive detections. If the current position of the push plate 110 of the first sample holder advancing mechanism 100 is the limiting position in more than two consecutive detections, the push plate 110 of the first sample holder advancing mechanism 100 is controlled to pause at the safety position, the first sample holder advancing mechanism 100 is switched from the sample introduction state to the pause state, and the second sample holder advancing mechanism 100 is controlled to move. Specifically, if the first sample holder advancing mechanism 100 is switched from the sample introduction state to the pause state, the second sample holder advancing mechanism 100 can be controlled to be switched to the sample introduction state according to the sample introduction trigger signal of the second sample holder advancing mechanism 100. The sample introduction process of the second sample holder advancing mechanism 100 is the same as the sample introduction process of the first sample holder advancing mechanism 100, which will not be repeated here. When pushing the sample holder in the sample loading device corresponding to the second sample holder advancing mechanism 100 is completed, the second sample holder advancing mechanism 100 is then switched to the pause state, and the first sample holder advancing mechanism 100 is switched to the sample introduction state according to the sample introduction trigger signal of the first sample holder advancing mechanism 100. In this way, during the sample introduction of the sample introduction apparatus, it is only needed to trigger the start button (the start button corresponding to any sample holder advancing mechanism) once to realize the linkage control of the multiple sample holder advancing mechanisms in the sample introduction apparatus, which is convenient to operate.

Of course, the sample holder advancing mechanisms can share one signal trigger device, and then, when the user triggers the signal trigger device, the control device can respectively control the sample holder advancing mechanisms to move alternately according to a preset order, so as to realize the sample introduction operation of the sample loading devices.

Alternatively, multiple sample holder advancing mechanisms can be individually controlled by the respective signal trigger devices. When the control device receives the sample introduction trigger signal of the first sample holder advancing mechanism 100, and the second sample holder advancing mechanism 100 is in the pause state, the lifting structure 120 of the first sample holder advancing mechanism 100 is controlled to drive the push plate 110 to move to the first position higher than the bottom wall of the sample loading device, and the advancing structure 130 of the first sample holder advancing mechanism 100 is controlled to drive the push plate 110 of the first sample holder advancing mechanism 100 to move in the direction from the initial position to the limiting position, so as to start the sample introduction of the current sample holder advancing mechanism 100, that is, the first sample holder advancing mechanism 100 is in the sample introduction state. The sample introduction of the first sample holder advancing mechanism can refer to the above description.

When the first sample holder advancing mechanism is in the sample introduction state, the sample introduction trigger signal of the second sample holder advancing mechanism can be detected in real time. When the control device receives the sample introduction trigger signal of the second sample holder advancing mechanism 100, and the first sample holder advancing mechanism 100 is in the sample introduction state, after the first sample holder advancing mechanism 100 is switched to the pause state, the second sample holder advancing mechanism 100 is then controlled to start the sample introduction. That is, after the first sample holder advancing mechanism 100 is switched to the pause state, the lifting structure 120 of the second sample holder advancing mechanism 100 is then controlled to drive the push plate 110 thereon to move to the first position higher than the bottom wall of the sample loading device, and the advancing structure 130 of the second sample holder advancing mechanism 100 is controlled to drive the push plate 110 of the second sample holder advancing mechanism 100 to move in the direction from the initial position to the limiting position, so as to start the sample introduction of the second sample holder advancing mechanism 100. The sample introduction of the second sample holder advancing mechanism can refer to the above description.

One embodiment of the present application further provides a sample analyzer, comprising a sample introduction apparatus and a sample analysis device connected in an end-to-end joint with the sample introduction apparatus as described in any one embodiment mentioned above, and the sample introduction apparatus can transfer sample holders to the sample analysis device.

Figure 6:
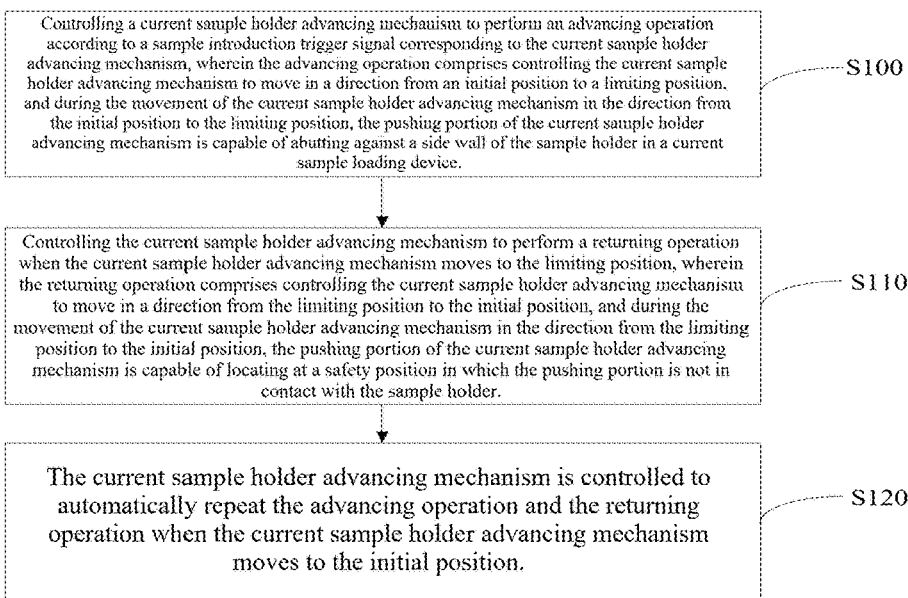
FIG. 6 is a flow chart of a continuous sample introduction method according to an embodiment.

As shown in FIG. 6, one embodiment of the present application further provides a continuous sample introduction method for the sample introduction apparatus described above. When the continuous sample introduction method is executed by the control device, the continuous automatic sample introduction of the sample introduction apparatus can be controlled. Specifically, the above method comprises the following steps.

S100, controlling a current sample holder advancing mechanism to perform an advancing operation according to a sample introduction trigger signal corresponding to the current sample holder advancing mechanism, wherein the advancing operation comprises controlling the current sample holder advancing mechanism to move in a direction from an initial position to a limiting position, and during the movement of the current sample holder advancing mechanism in the direction from the initial position to the limiting position, the pushing portion of the current sample holder advancing mechanism is capable of abutting against a side wall of the sample holder in a current sample loading device. For example, when the sample holder advancing mechanism is of the structure as shown in FIG. 2, during the movement of the sample holder advancing mechanism in the direction from the initial position to the limiting position, the control device can control the push plate to be located at the first position higher than the bottom wall of the sample loading device. For another example, the control device can control the push rod located on one side of the sample loading device to rotate to the first position parallel to the bottom wall of the sample loading device. Then, the push plate can push the sample holders located between the initial position and the limiting position to move synchronously, so as to push the sample holder into the sample analysis device next to the limiting position.

S110, controlling the current sample holder advancing mechanism to perform a returning operation when the current sample holder advancing mechanism moves to the limiting position, wherein the returning operation comprises controlling the current sample holder advancing mechanism to move in a direction from the limiting position to the initial position, and during the movement of the current sample holder advancing mechanism in the direction from the limiting position to the initial position, the pushing portion of the current sample holder advancing mechanism is capable of locating at a safety position in which the pushing portion is not in contact with the sample holder. The limiting position is located at one end of the sample loading device connected to a sample analysis device, and the initial position is located at the other end of the current sample loading device that is opposite to the limiting position. Specifically, after the pushing portion pushes all the sample holders between the current position of the pushing portion and the limiting position into the sample analysis device, the sample holder advancing mechanism can drive the pushing portion to move in the direction from the limiting position to the initial position, that is, the control device can execute the returning operation described above. During the returning of the sample holder advancing mechanism, in order to prevent the pushing portion from colliding with the sample holder between the current position of the pushing portion and the initial position, the control device can control the pushing portion to be not in contact with the sample holder in the sample loading device. For example, the control device can control the push plate of the sample holder advancing mechanism to be located at the second position lower than the bottom wall of the sample loading device. For another example, the control device can control the push rod located on one side of the sample loading device to rotate to the second position perpendicular to the bottom wall of the sample loading device.

S120, the current sample holder advancing mechanism is controlled to automatically repeat the advancing operation and the returning operation when the current sample holder advancing mechanism moves to the initial position. That is, when the current sample holder advancing mechanism moves to the initial position, the control device can repeatedly perform the steps S100 to S110 described above, and then, if there is a sample holder placed between the initial position and the limiting position, the current sample holder advancing mechanism can push the sample holder placed between the initial position and the limiting position again into the sample analysis device. When the sample holder between the initial position and the limiting position is pushed into the sample analysis device, the control device can control the sample holder advancing mechanism to perform the returning operation described above such that the current sample holder advancing mechanism returns to the initial position so as to realize the next advancing operation. In this way, the user can additionally place sample holders in the sample loading device without pausing the current sample holder advancing mechanism, and the control device can realize the continuous sample introduction of the sample holder by means of controlling the current sample holder advancing mechanism to automatically repeat the advancing operation and the returning operation.

Figure 7:
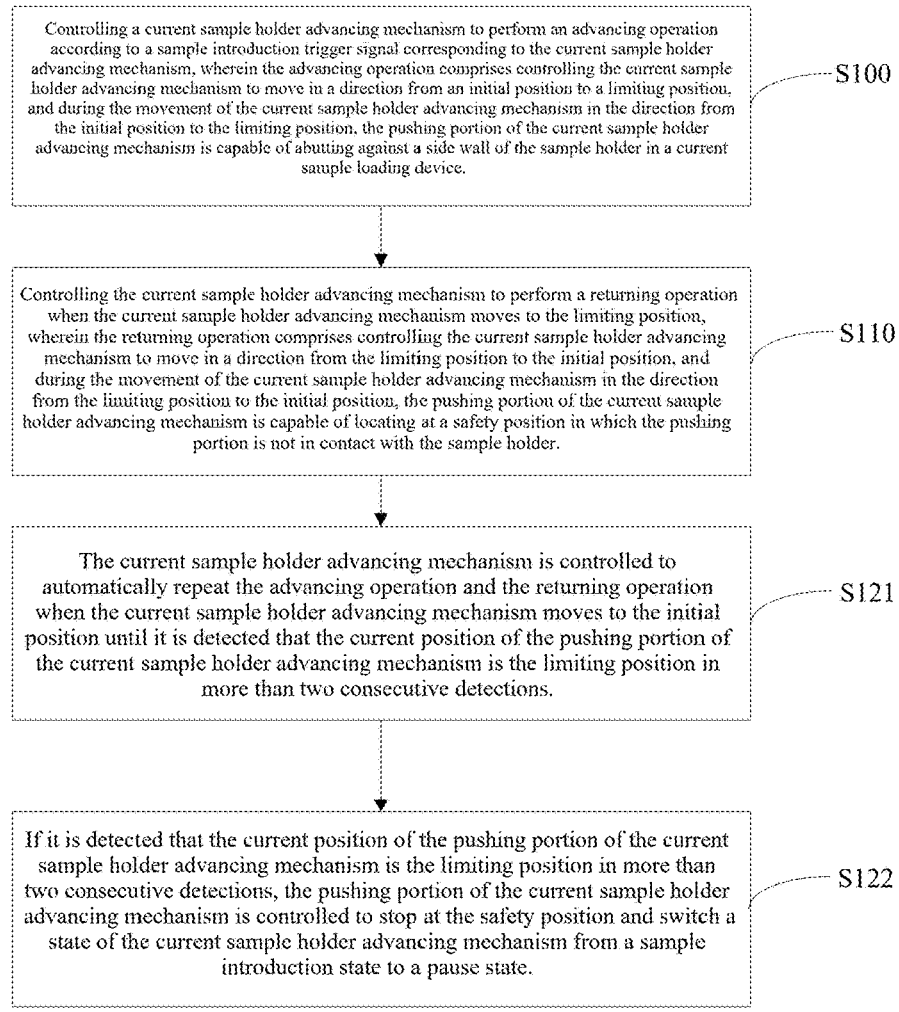
FIG. 7 is a flow chart of a continuous sample introduction method of a single sample loading device according to an embodiment.

In an embodiment, as shown in FIG. 7, the above step S120 may also comprise the following steps.

S121, the current sample holder advancing mechanism is controlled to automatically repeat the advancing operation and the returning operation when the current sample holder advancing mechanism moves to the initial position until it is detected that the current position of the pushing portion of the current sample holder advancing mechanism is the limiting position in more than two consecutive detections. Specifically, during the movement of the pushing portion driven by the sample holder advancing mechanism from the initial position to the limiting position, if there is no sample holder between the initial position and the limiting position at this time, the limiting position sensor can detect the pushing portion in two consecutive detections, such that the control device can determine that the pushing portion has pushed all the sample holders in the sample loading device into the sample analysis device. During the movement of the pushing portion driven by the sample holder advancing mechanism from the initial position to the limiting position, if there is a sample holder between the initial position and the limiting position at this time, the sample holder advancing mechanism continues to perform the advancing operation until the limiting position sensor can detect the pushing portion in two consecutive detections.

S122, if it is detected that the current position of the pushing portion of the current sample holder advancing mechanism is the limiting position in more than two consecutive detections, the pushing portion of the current sample holder advancing mechanism is controlled to stop at the safety position and switch a state of the current sample holder advancing mechanism from a sample introduction state to a pause state.

For example, when the sample introduction apparatus includes one sample loading device, when the current sample holder advancing mechanism moves to the initial position, the control device can control the current sample holder advancing mechanism to repeatedly perform the advancing operation and the returning operation, until it is detected that the current position of the pushing portion of the current sample holder advancing mechanism is the limiting position in more than two consecutive detections, such that the control device can determine that the pushing portion has pushed all the sample holders in the sample loading device into the sample analysis device. If it is detected that the current position of the pushing portion of the current sample holder advancing mechanism is the limiting position in more than two consecutive detections, the pushing portion of the current sample holder advancing mechanism is controlled to stop in the safety position and switch the state of motion of the current sample holder advancing mechanism from a sample introduction state to a pause state. That is, the control device can control the sample introduction apparatus to stop moving.

Figure 8:
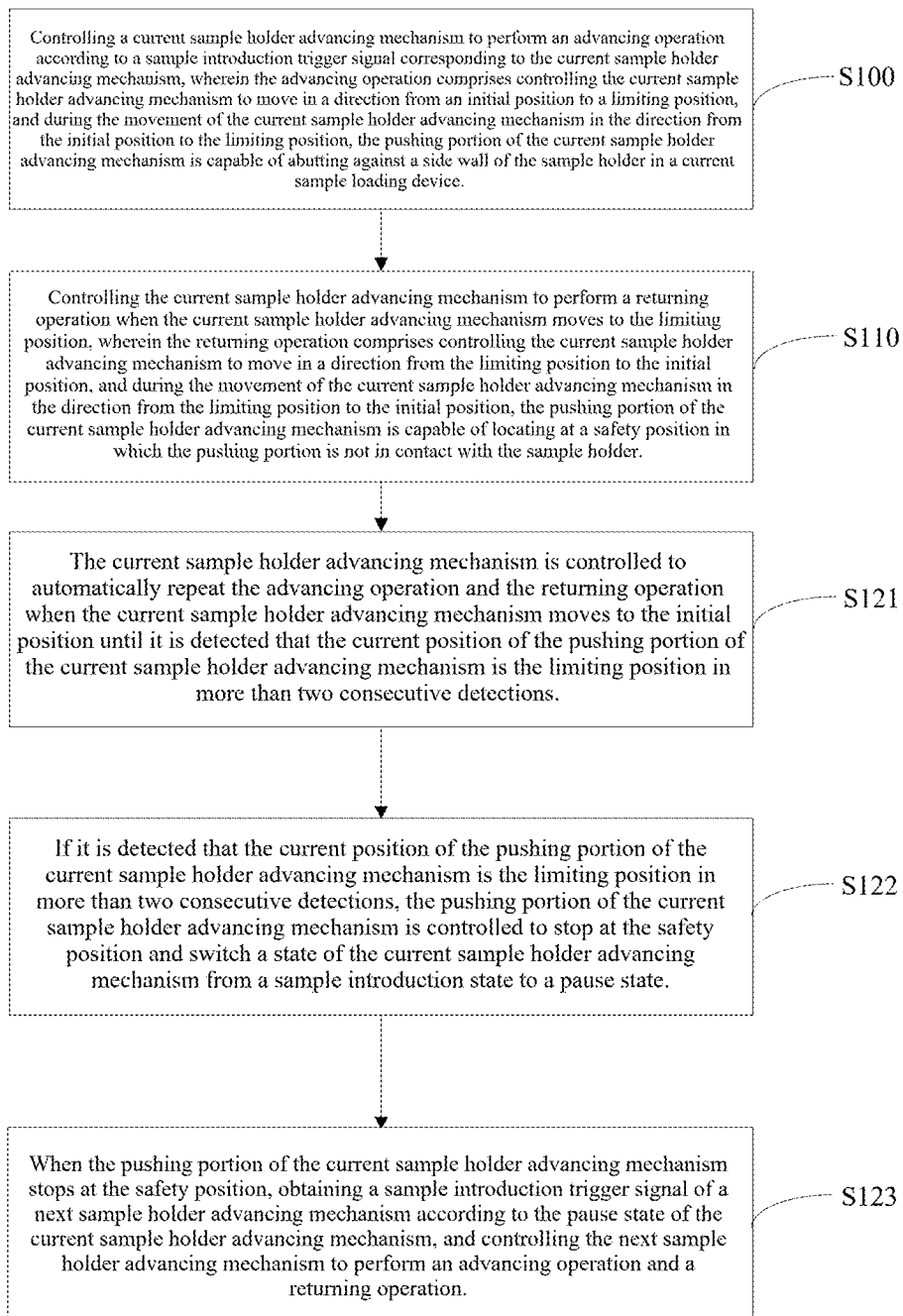
FIG. 8 is a flow chart of a continuous sample introduction method of multiple sample loading devices according to an embodiment.

Optionally, the number of the sample loading device may be more than two, and then, when the control device controls the current sample holder advancing mechanism to be switched to the pause state, the control device can continue to control other sample holder advancing mechanisms to move, so as to realize the sample introduction of the other sample loading devices. As shown in FIG. 8, the above method further comprises the following steps.

S123, when the pushing portion of the current sample holder advancing mechanism stops at the safety position, obtaining a sample introduction trigger signal of a next sample holder advancing mechanism according to the pause state of the current sample holder advancing mechanism, and controlling the next sample holder advancing mechanism to perform an advancing operation and a returning operation. Specifically, if the state of the current sample holder advancing mechanism is switched to the pause state, the change in state of the current sample holder advancing mechanism will trigger the movement of the next sample holder advancing mechanism. Optionally, the moving process of the next sample holder advancing mechanism can refer to the steps S100 to S110 described above.

In an embodiment, the control device can obtain the sample introduction trigger signal according to the trigger signal of the signal trigger device. For example, the signal trigger device is a start button arranged on the sample introduction apparatus, or the trigger device is a touch control arranged on the interaction display device; and the sample introduction trigger signal is the trigger signal of the start button or the touch control. Alternatively, the sample loading device is further provided with a movable carrying device for placing a sample holder, and each of the sample loading devices is provided with a loading detection device for detecting the movable carrying device; and the signal trigger device is the loading detection device, and the sample introduction trigger signal is a detection signal of the loading detection device.

Optionally, the sample introduction trigger signal of the next sample holder advancing mechanism in the step S123 described above can be obtained according to the pause state of the current sample holder advancing mechanism. Specifically, when the current sample holder advancing mechanism moves to the initial position, the state of the current sample holder advancing mechanism is switched from the sample introduction state to the pause state; and the sample introduction trigger signal of the next sample holder advancing mechanism is obtained according to the pause state of the current sample holder advancing mechanism, and the next sample holder advancing mechanism is controlled to perform the advancing operation and the returning operation.

The example of two sample loading devices and two sample holder advancing mechanisms will be taken for illustration below:

After the first sample holder advancing mechanism pushes all the sample holders in the corresponding first sample loading device to the sample analysis device, the control device can control the push plate of the first sample holder advancing mechanism to stop in the safety position, and switch the state of motion of the first sample holder advancing mechanism from the sample introduction state to the pause state. Then, the control device can obtain the sample introduction trigger signal of the second sample holder advancing mechanism according to the pause state of the sample holder advancing mechanism, and control the second sample holder advancing mechanism to start sample introduction according to the sample introduction trigger signal of the second sample holder advancing mechanism.

In other embodiments, when the number of the sample loading device and the corresponding sample holder advancing mechanism is more than three, the control device can determine the next sample holder advancing mechanism according to the order of arrangement of the sample loading devices. Optionally, the control device may also detect whether each sample loading device is provided with a sample holder placed therein so as to determine the next sample holder advancing mechanism, for example, the control device can detect whether each sample loading device is provided with a movable carrying device placed therein. When the control device determines that there is a movable carrying device placed in the sample loading device, the control device can use the sample holder advancing mechanism, which corresponds to the sample loading device provided with a movable carrying device placed therein, as the next sample holder advancing mechanism. If there is more than one sample loading device provided with a movable carrying device placed therein, the control device can determine the next sample holder advancing mechanism according to the placement time point of each movable carrying device and according to the order in time of the placement time points. Of course, in other embodiments, the control device may also randomly determine the next sample holder advancing mechanism.

Optionally, as shown in FIG. 10, each sample holder advancing mechanism is correspondingly provided with a signal trigger device for generating a sample introduction trigger signal; and the next sample holder advancing mechanism may be manually selected by the user. The above method further comprises the following steps.

S300, when the current sample holder advancing mechanism is in the sample introduction state, if other sample introduction trigger signals are received, updating respective states of sample holder advancing mechanisms corresponding to the other sample introduction trigger signals to a sample introduction ready state; and specifically, if the current sample holder advancing mechanism is in the sample introduction state, even if the other sample introduction trigger signals corresponding to the other sample holder advancing mechanisms are received, the control device will switch the state of the other sample holder advancing mechanisms that have received the sample introduction trigger signals to the sample introduction ready state, instead of immediately controlling the other sample holder advancing mechanisms to start the sample introduction operation.

S310, when the pushing portion of the current sample holder advancing mechanism stops at the safety position, selecting any one of the other sample introduction trigger signals as the sample introduction trigger signal of the next sample holder advancing mechanism, and the next sample holder advancing mechanism is controlled to perform the advancing operation and the returning operation.

Specifically, if the current sample holder advancing mechanism has pushed all the sample holders in the corresponding sample loading device into the sample analysis device, the control device can switch the state of the current sample holder advancing mechanism from the sample introduction state to the pause state, and control the push plate of the current sample holder advancing mechanism to stop at the safety position. If the push plate of the current sample holder advancing mechanism is in the pause state, the control device can select a sample introduction trigger signal from the received sample introduction trigger signals corresponding to the other sample holder advancing mechanisms, use the selected sample introduction trigger signal as the sample introduction trigger signal of the next sample holder advancing mechanism, and control the state of the next sample holder advancing mechanism to switch from the sample introduction ready state to the sample introduction state. Optionally, the control device can select a sample introduction trigger signal according to the order in time of the received sample introduction trigger signals, for example, the control device can use the sample introduction trigger signal first received as the sample introduction trigger signal of the next sample holder advancing mechanism.

When the push plate of the current sample holder advancing mechanism is in the pause state, and the control device does not receive the sample introduction trigger signal corresponding to the further sample holder advancing mechanism, the control device only controls the push plate of the current sample holder advancing mechanism to stop in the safety position, and controls the further sample holder advancing mechanism to be still in the pause state. Then, the whole sample introduction apparatus stops sample introduction.

The example of two sample loading devices and two sample holder advancing mechanisms will be taken for illustration below:

After the first sample holder advancing mechanism pushes all the sample holders in the first sample loading device to the sample analysis device, the control device can control the push plate of the first sample holder advancing mechanism to stop at the safety position, and switch the state of the first sample holder advancing mechanism from the sample introduction state to the pause state. Then, if the control device has received the sample introduction trigger signal of the second sample holder advancing mechanism, the control device can control the second sample holder advancing mechanism to start sample introduction. If the control device does not receive the sample introduction trigger signal of the second sample holder advancing mechanism, the control device controls the second sample holder advancing mechanism to be still in the pause state.

In an embodiment, as shown in FIG. 9, specifically, the above method comprises the following steps.

S200, controlling a current sample holder advancing mechanism to perform an advancing operation according to a sample introduction trigger signal corresponding to the current sample holder advancing mechanism, wherein the advancing operation comprises controlling the current sample holder advancing mechanism to move in a direction from an initial position to a limiting position, and during the movement of the current sample holder advancing mechanism in the direction from the initial position to the limiting position, the pushing portion of the current sample holder advancing mechanism is capable of abutting against the side wall of the sample holder in a current sample loading device. For example, when the sample holder advancing mechanism is of the structure as shown in FIG. 2, during the movement of the sample holder advancing mechanism in the direction from the initial position to the limiting position, the control device can control the push plate to be located in the first position higher than the bottom wall of the sample loading device. For another example, the control device can control the push rod located on one side of the sample loading device to rotate to the first position parallel to the bottom wall of the sample loading device. Then, the push plate can push the sample holders located between the initial position and the limiting position to move synchronously, so as to push the sample holder into the sample analysis device next to the limiting position.

S210, controlling the current sample holder advancing mechanism to perform a returning operation when the current sample holder advancing mechanism moves to the limiting position, wherein the returning operation comprises controlling the current sample holder advancing mechanism to move in a direction from the limiting position to the initial position, and during the movement of the current sample holder advancing mechanism in the direction from the limiting position to the initial position, the pushing portion of the current sample holder advancing mechanism is capable of locating at a safety position in which the pushing portion is not in contact with the sample holder. The limiting position is located at one end of the sample loading device connected to a sample analysis device, and the initial position is located at the end opposite the limiting position. Specifically, after the pushing portion pushes all the sample holders between the current position thereof and the limiting position into the sample analysis device, the sample holder advancing mechanism can drive the pushing portion to move in the direction from the limiting position to the initial position, that is, the control device can execute the returning operation described above. During the returning of the sample holder advancing mechanism, in order to prevent the pushing portion from colliding with the sample holder between the current position thereof and the initial position, the control device can control the pushing portion to be not in contact with the sample holder in the sample loading device. For example, the control device can control the push plate of the sample holder advancing mechanism to be located in the second position lower than the bottom wall of the sample loading device. For another example, the control device can control the push rod located on one side of the sample loading device to rotate to the second position perpendicular to the bottom wall of the sample loading device.

S220, the current sample holder advancing mechanism is controlled to repeatedly perform the advancing operation and the returning operation when the current sample holder advancing mechanism moves to the initial position; or when the current sample holder advancing mechanism moves to the initial position, a sample introduction trigger signal of a next sample holder advancing mechanism is obtained, and the next sample holder advancing mechanism is controlled to perform the advancing operation and the returning operation, and if other sample holder advancing mechanisms are all in a pause state, the current sample holder advancing mechanism is controlled to repeatedly perform the advancing operation and the returning operation.

The example of two sample loading devices and two sample holder advancing mechanisms will be taken for illustration below:

If the first sample holder advancing mechanism completes one round of advancing operation and returning operation, the control device can control the state of motion of the first sample holder advancing mechanism to be switched from the sample introduction state to the pause state. Then, if the control device has received the sample introduction trigger signal of the second sample holder advancing mechanism, the control device can control the second sample holder advancing mechanism to start execution of the advancing operation and the returning operation. Then, the control device can continue to control the first sample holder advancing mechanism to start execution of the advancing operation and the returning operation, so as to alternately realize the pushing of the sample holders in the sample loading device in cycles.

Optionally, the sample introduction trigger signal of the next sample holder advancing mechanism in the step S220 described above can be obtained according to the pause state of the current sample holder advancing mechanism. The above method further comprises: when the current sample holder advancing mechanism moves to the initial position, switching the state of the current sample holder advancing mechanism from the sample introduction state to the pause state; and obtaining the sample introduction trigger signal of the next sample holder advancing mechanism according to the pause state of the current sample holder advancing mechanism, and controlling the next sample holder advancing mechanism to perform the advancing operation and the returning operation. The specific execution process thereof is consistent with the process of obtaining the sample introduction trigger signal of the next sample holder advancing mechanism in the above step S123, which specifically refer to the above description.

Optionally, as shown in FIG. 10, each sample holder advancing mechanism is correspondingly provided with a signal trigger device for generating a sample introduction trigger signal; and the next sample holder advancing mechanism may be manually selected by the user. That is, the above step S220 further comprises the following steps:

S300, when the current sample holder advancing mechanism is in the sample introduction state, if other sample introduction trigger signals are received, updating respective states of sample holder advancing mechanisms corresponding to the other sample introduction trigger signals to a sample introduction ready state; and S310, when the pushing portion of the current sample holder advancing mechanism stops at the safety position, selecting any one of the other sample introduction trigger signals as the sample introduction trigger signal of the next sample holder advancing mechanism, and the next sample holder advancing mechanism is controlled to perform the advancing operation and the returning operation.

In an embodiment, the sample holder advancing mechanism uses the structure as shown in FIG. 2, and may comprise a lifting structure on which a pushing portion is provided. The above method further comprises the following steps.

when the current sample holder advancing mechanism performs the advancing operation, controlling the lifting structure to drive the pushing portion to move to a first position higher than a bottom wall of the current sample loading device; and when the current sample holder advancing mechanism performs the returning operation, controlling the lifting structure to drive the pushing portion to move to a second position lower than the bottom wall of the current sample loading device, the second position being the safety position.

In an embodiment, the above returning operation further comprises the following step:

whenever the current sample holder advancing mechanism moves for a preset distance or for a preset period of time from the limiting position to the initial position, controlling the pushing portion of the current sample holder advancing mechanism to move to the second position lower than the bottom wall of the sample loading device. Specifically, when the push plate moves to the limiting position, if the control device directly controls the push plate to descend to the second position lower than the bottom wall of the sample loading device, the push plate is likely to collide with the sample loading device. Therefore, in order to prevent damage to the push plate in the situation mentioned above, after the push plate moves a preset distance or for a preset period of time from the limiting position to the initial position, the control device can control the push plate again to move downward to the second position lower than the bottom wall of the sample loading device. Optionally, the preset distance or the preset period of time may be determined according to the extension length of the push plate in the direction from the initial position to the limiting position.

In another embodiment, a sensing signal emission device may be provided in the limiting position, a sensing signal induction device may be provided in the initial position, and the control device can determine whether there is a sample holder between the initial position and the limiting position according to the sample holder detection signal transferred by the sensing signal induction device. Therefore, during the movement of the advancing assembly driven by the second driving component in the direction from the limiting position to the initial position, when there is a sample holder between the limiting position and the initial position, the control device can control the push plate again to descend to the second position lower than the sample loading device. Specifically, during the movement of the advancing assembly driven by the second driving component in the direction from the limiting position to the initial position, the above method further comprises the following step:

obtaining a sample holder detection signal in real time. The sample holder detection signal may be a signal generated by induction by means of the sensing signal induction device.

When it is determined that a sample holder is located between the current position of the push plate and the initial position according to the sample holder detection signal, the first driving component is controlled to drive the lifting assembly to move so as to enable the push plate to move to the second position lower than the bottom wall of the sample loading device. When it is determined that there is no sample holder between the current position of the push plate and the initial position according to the sample holder detection signal, the push plate can be controlled to descend to the second position according to the descending trigger mechanism in the above embodiment. Of course, in other embodiments, when it is determined that there is no sample holder between the current position of the push plate and the initial position according to the sample holder detection signal, the push plate may also be controlled to be located in the unchanged first position higher than the bottom wall of the sample loading device.

In an embodiment, the sample holder advancing mechanism further comprises an advancing structure, and the lifting structure is arranged on an advancing structure. The advancing structure comprises an advancing guide component, a first sliding component and a second sliding component arranged on the advancing guide component, and a flexible connecting member, and the second sliding component is connected to the first sliding component via the flexible connecting member. Optionally, if there is a sample holder between the push plate and the limiting position, the push plate first pushes the sample holder to the limiting position, and when the push plate pushes all the sample holders between the current position thereof and the limiting position to the sample analysis device, the push plate can move to the limiting position. Therefore, before the push plate moves to the limiting position, the method further comprises a sample holder detection and pushing step. Specifically, as shown in FIG. 11, the above method further comprises the following step:

S400, obtaining a connection state of the first detection element and the second detection element in real time; and S410, when the connection state of the first detection element and the second detection element is switched from a first state to a second state, determining that the foremost sample holder between the current position of the push plate and the limiting position driven by the push plate moves to the limiting position; wherein the first state is an engaged state, and the second state is a disengaged state; or the first state is a disengaged state, and the second state is an engaged state. Specifically, when the connection state of the first detection element and the second detection element is switched from the first state to the second state, it can be determined that the movement of the foremost sample holder is limited, and then, it can be determined that the foremost sample holder has moved to the limiting position, and the foremost sample holder can be pushed into the sample analysis device.

Further, the above method further comprises the following step:

S420, whenever the foremost sample holder between the current position of the push plate and the limiting position is driven by the push plate to move to the limiting position, controlling the push plate to move for a preset distance from the current position to the initial position.

Those of ordinary skill in the art would have been able to understand that the implementation of all or some of the procedures of the methods in the embodiments described above could be achieved by hardware controlled by a computer program. The program can be stored in a non-transitory computer-readable storage medium, and when being executed, may implement the methods described above. The storage medium may be a magnetic disk, an optical disk, a read-only memory (ROM), a random access memory (RAM), etc.

One embodiment of the present application further provides a computer-readable storage medium with a computer program stored therein, the computer program implementing the steps in the method as described in any one of the above embodiments when being executed by a processor. It should be clear that when the computer program is executed by the processor, the execution process of the processor is consistent with the execution process of the foregoing method, which can specifically refer to the above description.

According to the continuous sample introduction method, the sample introduction apparatus and the storage medium described above, during the movement of a push plate in the direction from the initial position to the limiting position, the push plate is controlled to be located in a first position higher than a bottom wall of the sample loading device, such that the push plate can abut against sample holders located between the current position of the push plate and the limiting position to drive the sample holders located between the current position of the push plate and the limiting position to move synchronously, so as to realize the transfer of the sample holders and the sample introduction; and during the movement of the push plate in the direction from the limiting position to the initial position, the push plate is controlled to be located in a second position lower than the bottom wall of the sample loading device, such that the push plate is not in contact with the sample holders located in the sample loading device, so as to avoid the hidden danger or failure of sample introduction that may occur when new sample holders are additionally placed into the sample loading device while the sample holder advancing mechanism is moving, such that new sample holders can be additionally placed into the sample loading device without pausing the sample holder advancing mechanism and without pausing the sample detection operation, thereby realizing continuous sample introduction.

The technical features of the embodiments described above can be arbitrarily combined, but for brevity, not all possible combinations of the technical features in the embodiments described above have been described. However, as long as there is no contradiction in any combination of these technical features, they should be considered to fall within the scope of disclosure of this specification.

The above embodiments merely represent several implementations of the present application, giving specifics and details thereof, but should not be understood as limiting the scope of the invention thereby. It should be noted that those of ordinary skill in the art could also make several alterations and improvements without departing from the spirit of the present application and these would all fall within the scope of protection of the present application. Therefore, the scope of protection of the present patent of application shall be in accordance with the appended claims.

What is claimed is:

1. A continuous sample introduction method for a sample introduction apparatus, the sample introduction apparatus comprising one or more sample loading devices, each of which is correspondingly provided with a sample holder advancing mechanism which comprises a pushing portion capable of abutting against a side wall of a sample holder in the sample loading device, the method comprising:

controlling a current sample holder advancing mechanism to perform an advancing operation according to a sample introduction trigger signal corresponding to the current sample holder advancing mechanism, wherein the advancing operation comprises controlling the current sample holder advancing mechanism to move in a direction from an initial position to a limiting position, and during movement of the current sample holder advancing mechanism in the direction from the initial position to the limiting position, the pushing portion of the current sample holder advancing mechanism is capable of abutting against the side wall of the sample holder in a current sample loading device;

controlling the current sample holder advancing mechanism to perform a returning operation in response to detecting that the current sample holder advancing mechanism reaches the limiting position, wherein the returning operation comprises controlling the current sample holder advancing mechanism to move from the limiting position to the initial position, and during the movement of the current sample holder advancing mechanism from the limiting position to the initial position, the pushing portion of the current sample holder advancing mechanism is capable of locating at a safety position in which the pushing portion is not in contact with the sample holder; and the current sample holder advancing mechanism automatically repeats the advancing operation and the returning operation when the current sample holder advancing mechanism moves to the initial position;

wherein the limiting position is located at one end of the current sample loading device connected to a sample analysis device, and the initial position is located at the other end of the current sample loading device that is opposite to the limiting position.

2. The method of claim 1, wherein the current sample holder advancing mechanism automatically repeats the advancing operation and the returning operation when the current sample holder advancing mechanism moves to the initial position, comprises:

when the current sample holder advancing mechanism moves to the initial position, controlling the pushing portion to perform a secondary pushing operation;

if no sample holders exist between a current position of the pushing portion of the current sample holder advancing mechanism and the limiting position during the secondary pushing operation and the pushing portion directly moves to the limiting position, controlling the pushing portion of the current sample holder advancing mechanism to stop at the safety position and switch a state of the current sample holder advancing mechanism from a sample introduction state to a pause state.

3. The method of claim 2, wherein the current sample holder advancing mechanism automatically repeats the advancing operation and the returning operation when the current sample holder advancing mechanism moves to the initial position, comprises:

if it is detected that the current position of the pushing portion of the current sample holder advancing mechanism is the limiting position in at least two consecutive detections, controlling the pushing portion of the current sample holder advancing mechanism to stop at the safety position and switch a state of the current sample holder advancing mechanism from a sample introduction state to a pause state.

4. The method of claim 3, wherein when the pushing portion of the current sample holder advancing mechanism stops at the safety position, obtaining a sample introduction trigger signal of a next sample holder advancing mechanism according to the pause state of the current sample holder advancing mechanism, and controlling the next sample holder advancing mechanism to perform an advancing operation and a returning operation.

5. The method of claim 4, wherein when the current sample holder advancing mechanism is in the sample introduction state, if other sample introduction trigger signals are received, updating respective states of sample holder advancing mechanisms corresponding to the other sample introduction trigger signals to a sample introduction ready state; and when the pushing portion of the current sample holder advancing mechanism stops at the safety position, selecting any one of the other sample introduction trigger signals as the sample introduction trigger signal of the next sample holder advancing mechanism.

6. The method of claim 1, wherein the returning operation further comprises:

obtaining a sample holder detection signal in real time; and when it is determined that at least one sample holder is located between a current position of the pushing portion and the initial position according to the sample holder detection signal, controlling the pushing portion to move to the safety position.

7. The method of claim 1, wherein the current sample holder advancing mechanism further comprises a lifting structure on which the pushing portion is provided; and the method further comprises:

when the current sample holder advancing mechanism performs the advancing operation, controlling the lifting structure to drive the pushing portion to move to a first position higher than a bottom wall of the current sample loading device; and when the current sample holder advancing mechanism performs the returning operation, controlling the lifting structure to drive the pushing portion to move to a second position lower than the bottom wall of the current sample loading device, the second position being the safety position.

8. The method of claim 1, wherein the current sample holder advancing mechanism further comprises an advancing structure connected to the pushing portion, the advancing structure comprising an advancing guide component, a first sliding component, a second sliding component, and a flexible connecting member, the first sliding component and the second sliding component being arranged on the advancing guide component, and the second sliding component being connected to the first sliding component via the flexible connecting member; the method further comprises:

obtaining a position detection signal of the second sliding component in real time; and when it is determined that the second sliding component is located at the limiting position according to the position detection signal of the second sliding component, determining that a current position of the pushing portion of the current sample holder advancing mechanism is the limiting position.

9. The method of claim 1, further comprising:

whenever the foremost sample holder between a current position of the pushing portion and the limiting position is driven by the pushing portion to move to the limiting position, controlling the pushing portion to move for a preset distance from the current position to the initial position.

10. The method of claim 9, wherein the current sample holder advancing mechanism further comprises an advancing structure connected to the pushing portion, the advancing structure comprising an advancing guide component, a first sliding component, a second sliding component, and a flexible connecting member, the first sliding component and the second sliding component being arranged on the advancing guide component, the second sliding component being connected to the first sliding component via the flexible connecting member, the second sliding component being provided with a first detection element, and the first sliding component being provided with a second detection element corresponding to the first detection element; and the method further comprises:

obtaining a connection state of the first detection element and the second detection element in real time; and when the connection state of the first detection element and the second detection element is switched from a first state to a second state, determining that the foremost sample holder between the current position of the pushing portion and the limiting position driven by the pushing portion reaches the limiting position;

wherein the first state is an engaged state, and the second state is a disengaged state; or the first state is a disengaged state, and the second state is an engaged state.

11. The method of claim 1, wherein the returning operation further comprises:

whenever the current sample holder advancing mechanism moves for a preset distance or for a preset period of time from the limiting position to the initial position, controlling the pushing portion of the current sample holder advancing mechanism to move to the safety position.

12. A sample introduction apparatus, comprising:
a sample loading device;
a sample holder advancing mechanism provided corresponding to the sample loading device, and the sample holder advancing mechanism comprising a pushing portion; and
a control device for controlling the sample holder advancing mechanism to perform an advancing operation and a returning operation between an initial position and a limiting position according to a sample introduction trigger signal, wherein when the control device controls the sample holder advancing mechanism to perform the advancing operation, the pushing portion is capable of abutting against a side wall of a sample holder, and when the control device controls, in response to detecting that the current sample holder advancing mechanism reaches the limiting position, the sample holder advancing mechanism to perform the returning operation, the pushing portion is capable of being located at a safety position in which the pushing portion is not in contact with the sample holder; and
when a current sample holder advancing mechanism moves to the initial position, the current sample holder advancing mechanism automatically repeats the advancing operation and the returning operation.

13. The sample introduction apparatus of claim 12, wherein:

when the current sample holder advancing mechanism moves to the initial position, the control device controls the pushing portion to perform a secondary pushing operation;

if no sample holders exist between a current position of the pushing portion of the current sample holder advancing mechanism and the limiting position during the secondary pushing operation and the pushing portion directly moves to the limiting position, the control device controls the pushing portion to stop at the safety position, and switch a state of the current sample holder advancing mechanism from a sample introduction state to a pause state.

14. The sample introduction apparatus of claim 13, wherein when it is detected that the current position of the pushing portion of the current sample holder advancing mechanism is the limiting position in at least two consecutive detections, the control device controls the pushing portion to stop at the safety position, and switch a state of the current sample holder advancing mechanism from a sample introduction state to a pause state.

15. The sample introduction apparatus of claim 14, wherein when the pushing portion of the current sample holder advancing mechanism stops at the safety position, the control device obtains a sample introduction trigger signal of a next sample holder advancing mechanism according to the pause state of the current sample holder advancing mechanism, and controls the next sample holder advancing mechanism to perform an advancing operation and a returning operation.

16. The sample introduction apparatus of claim 12, wherein when the sample holder advancing mechanism moves for a preset distance or for a preset period of time from the limiting position to the initial position, the control device controls the pushing portion to move to the safety position.

17. The sample introduction apparatus of claim 12, whenever the foremost sample holder between a current position of the pushing portion and the limiting position is driven by the pushing portion to move to the limiting position, the control device controls the pushing portion to move for a preset distance from the current position to the initial position.

18. The sample introduction apparatus of claim 17, wherein the sample holder advancing mechanism further comprises an advancing structure connected to the pushing portion, the advancing structure comprising an advancing guide component, a first sliding component, a second sliding component, and a flexible connecting member, wherein the first sliding component and the second sliding component are arranged on the advancing guide component, the second sliding component is connected to the first sliding component via the flexible connecting member, the second sliding component is provided with a first detection element, and the first sliding component is provided with a second detection element corresponding to the first detection element; and when a connection state of the first detection element and the second detection element is switched from a first state to a second state, the foremost sample holder between the current position of the pushing portion and the limiting position driven by the pushing portion reaches the limiting position;

wherein the first state is an engaged state, and the second state is a disengaged state; or the first state is a disengaged state, and the second state is an engaged state.

19. The sample introduction apparatus of claim 15, wherein when the current sample holder advancing mechanism is in the sample introduction state, if other sample introduction trigger signals are received, the control device updates respective states of sample holder advancing mechanisms corresponding to the other sample introduction trigger signals to a sample introduction ready state; and when the pushing portion of the current sample holder advancing mechanism stops at the safety position, the control device selects any one of the other sample introduction trigger signals as the sample introduction trigger signal of the next sample holder advancing mechanism.

20. The sample introduction apparatus of claim 12, wherein the sample holder advancing mechanism further comprises a lifting structure on which the pushing portion is provided;

when the sample holder advancing mechanism performs the advancing operation, the control device controls the lifting structure to drive the pushing portion to move to a first position higher than a bottom wall of the sample loading device; and when the sample holder advancing mechanism performs the returning operation, the control device controls the lifting structure to drive the pushing portion to move to a second position lower than the bottom wall of the sample loading device, the second position is the safety position.

21. A non-transitory computer-readable storage medium having a computer program stored therein, wherein the computer program, when executed by a processor, performs a continuous sample introduction method for a sample introduction apparatus, the sample introduction apparatus comprising one or more sample loading devices, each of which is correspondingly provided with a sample holder advancing mechanism which comprises a pushing portion capable of abutting against a side wall of a sample holder in the sample loading device, the method comprising:

controlling a current sample holder advancing mechanism to perform an advancing operation according to a sample introduction trigger signal corresponding to the current sample holder advancing mechanism, wherein the advancing operation comprises controlling the current sample holder advancing mechanism to move in a direction from an initial position to a limiting position, and during the movement of the current sample holder advancing mechanism in the direction from the initial position to the limiting position, the pushing portion of the current sample holder advancing mechanism is capable of abutting against the side wall of the sample holder in a current sample loading device;

controlling the current sample holder advancing mechanism to perform a returning operation in response to detecting that the current sample holder advancing mechanism reaches the limiting position, wherein the returning operation comprises controlling the current sample holder advancing mechanism to move from the limiting position to the initial position, and during the movement of the current sample holder advancing mechanism from the limiting position to the initial position, the pushing portion of the current sample holder advancing mechanism is capable of locating at a safety position in which the pushing portion is not in contact with the sample holder; and the current sample holder advancing mechanism automatically repeats the advancing operation and the returning operation when the current sample holder advancing mechanism moves to the initial position;

wherein the limiting position is located at one end of the current sample loading device connected to a sample analysis device, and the initial position is located at the other end of the current sample loading device that is opposite to the limiting position.

* * * * *